United States Patent [19]

Rosensweig

[11] 4,136,016
[45] Jan. 23, 1979

[54] HYDROCARBON CONVERSION PROCESS UTILIZING A MAGNETIC FIELD IN A FLUIDIZED BED OF CATALITIC PARTICLES

[75] Inventor: Ronald E. Rosensweig, Summit, N.J.

[73] Assignee: Exxon Research & Engineering Co., Florham Park, N.J.

[21] Appl. No.: 866,780

[22] Filed: Jan. 3, 1978

Related U.S. Application Data

[60] Division of Ser. No. 786,613, Apr. 11, 1977, Pat. No. 4,115,927, which is a continuation-in-part of Ser. No. 610,071, Sep. 3, 1975, abandoned, which is a continuation-in-part of Ser. No. 514,003, Oct. 11, 1974, abandoned.

[51] Int. Cl.² .................... C10G 23/10; C10G 35/14
[52] U.S. Cl. .................... 208/134; 208/213
[58] Field of Search ............ 208/213, 134, 209, 177, 208/133, 46, 108

[56] References Cited

U.S. PATENT DOCUMENTS

| Re. 25,770 | 4/1965 | Johanson | 208/213 |
| 2,614,064 | 10/1952 | Carney | 208/177 |
| 2,987,468 | 6/1961 | Chervenak | 208/213 |
| 3,440,731 | 4/1969 | Tuthill | 34/1 |

OTHER PUBLICATIONS

D. G. Ivanov et al., International Chemical Engineering vol. 15, No. 3, pp. 557-560, (1975) Investigation of the Heterogeneity of a Fluidized Bed of Catalyst for the Synthesis of Ammonia in an Electromagnetic Field.
D. G. Ivanov et al., Kinetika: Kataliz vol. 11, No. 5, pp. 1214-1219 (1970) Ammonia Synthesis on a Catalyst Fluidized in a Magnetic Field.

*Primary Examiner*—George Crasanakis
*Attorney, Agent, or Firm*—Albert P. Halluin

[57] ABSTRACT

A hydrocarbon conversion process, such as catalytic desulfurization of a vaporized petroleum feedstock with hydrogen or catalytic reforming of a vaporized hydrocarbon feedstock, is carried out by passing the gaseous medium upwardly through a fluidized bed of magnetizable composite particles having catalytic activity for hydrocarbon conversion and which contain 2 to 40 volume % ferro- or ferrimagnetic material to a nontime varying (direct current) and substantially uniform applied magnetic field having a substantial component along the direction of gravity such that the composite particles have a component of magnetization along the direction of gravity. The gaseous medium is also the fluidizing medium passing upwardly at a superficial gas velocity ranging between:

(1) at least twice the normal minimum superficial gas velocity required to fluidize the bed in the absence of said applied magnetic field, and
(2) less than the superficial gas velocity required to cause time-varying fluctuations of pressure difference through said bed for a 0.1 to 1 second time interval during continuous fluidization in the presence of said applied magnetic field.

6 Claims, 7 Drawing Figures

HYDROCARBON CONVERSION PROCESS UTILIZING A MAGNETIC FIELD IN A FLUIDIZED BED OF CATALITIC PARTICLES

CROSS REFERENCE TO RELATED APPLICATION

This application is a division of application Ser. No. 786,613, filed Apr. 11, 1977, now U.S. Patent No. 4,115,927, granted Sept. 26, 1978, which in turn is a continuation-in-part of application Ser. No. 610,071, filed Sept. 3, 1975, and now abandoned, which in turn is a continuation-in-part of application Ser. No. 514,003, filed Oct. 11, 1974, now abandoned.

FIELD OF THE INVENTION

This invention relates to a fluidized bed process. More particularly, the present invention is concerned with a process for operating a magnetically stabilized fluidized bed under conditions such that the flow of gas used to fluidize solid particulate magnetizable and fluidizable particles and an applied magnetic field are controlled to the extent that there is substantially no time-varying fluctuation of pressure at a point taken in the bed. Such a magnetically stabilized medium has the appearance of an expanded fixed bed; there is no gross solids circulation and very little or no gas bypassing. A bed of the magnetically stabilized medium shares many qualities of the normal fluidized bed; pressure drop is effectively equal to the weight of the bed divided by its cross sectional area, and independent of gas flow rate or of particle size; the medium will flow, permitting continuous solids throughput. Beds of the magnetically stabilized media also share some of the qualities of a fixed bed; countercurrent contacting can be readily attained; gas bypassing is small or absent, making it possible to achieve high conversions and attrition is minimal or absent.

The simultaneous possession of properties usually associated with the media of fixed and of fluid beds is highlighted, for example, in the use of a magnetically stabilized medium to trap particulates. Like the medium of a fixed bed, it will trap the particulates; like the medium of a fluid bed, it will not clog — the pressure drop of a bed of the medium will increase only by as much as due to the weight of the trapped material.

BACKGROUND OF THE INVENTION

Many chemical and physical processes such as catalytic cracking, hydrogenation, oxidation, reduction, drying, polymerization, coating, filtering and the like are carried out in fluidized beds. A fluidized bed briefly, consists of a mass of solid particulate fluidizable material in which the individual particles are neutrally levitated free of each other by fluid drag forces whereby the mass or fluidized bed possesses the characteristics of a liquid. Like a liquid, it will flow or pour freely, there is a hydrostatic head pressure, it seeks a constant level, it will permit the immersion of objects and will support relatively buoyant objects, and in many other properties it acts like a liquid. A fluidized bed is conventionally produced by effecting a flow of a fluid, usually gas, through a porous or perforated plate or membrane underlying the particulate mass, at a sufficient rate to support the individual particles against the force of gravity. Conditions at the minimum fluid flow required to produce the fluid-like, or fluidized condition, i.e., the incipient fluidization point are dependent on many parameters including particle size, particle density, etc. Any increase in the fluid flow beyond the incipient fluidization point causes an expansion of the fluidized bed to accommodate the increased fluid flow until the gas velocity exceeds the free falling velocity of the particles which are then carried out of the apparatus, a condition otherwise known as entrainment.

Fluidized beds possess many desirable attributes, for example, in temperature control, heat transfer, catalytic reactions, and various chemical and physical reactions such as oxidation, reduction, drying, polymerization, coating, diffusion, filtering and the like.

Among the problems associated with fluidized beds, a most basic one is that of bubble formation, frequently resulting in slugging, channeling, spouting, attrition and pneumatic transport. This problem is most common in gas-fluidized systems. Bubbling causes both chemical and mechanical difficulties: for example, in gas-solids reaction gas bubbles may bypass the particles altogether resulting in lowered contacting efficiency while chaotic motion of the bed solids may set up detrimental mechanical stresses tending to deteriorate the vessel and its contents. Many procedures and systems have been proposed to effect improvements, for example, by the use of baffles, gas distribution perforated plates, mechanical vibration and mixing devices, the use of mixed particle sizes, gas plus liquid flow schemes, special flow control valves, etc.

for example, U.S. Pat. No. 3,169,835 to Huntley et al disclose that mesh packing throughout the bed breaks up large gaseous bubbles and prevents coalescence of existing bubbles. However, baffle devices do not prevent the initiation of bubble formation.

DESCRIPTION OF THE PRIOR ART

In recent years patents have issued which describe means for suppressing bubble formation in a fluidized bed. For example, U.S. Pat. No. 3,304,249 to Katz discloses that a stabilized fluidized bed is obtained when a bed containing solids having a moderate surface electroconductivity is fluidized by a gaseous medium having a sufficiently high ionizapotential to provide a corona discharge without arcing and subjecting a high voltage to a portion of the bed to cause a corona discharge in the fluidized bed.

In another patent, U.S. Pat. No. 3,439,899 to Hershler, there is dislosed a process for producing a fluidized bed free of bubbles by passing a fluid upwardly through a particulate solid fluidizable material which includes a plurality of discrete magnet particles having a coercive force exceeding 50 oersteds to impart an upward force to the solid particulate fluidizable material and subjecting the fluidizable material to a magnetic field varying with time in direction and intensity to impart individual motions to the magnet particles. A similar process is disclosed in U.S. Pat. No. 3,219,318 to Hershler. Z. I. Nekrasov and V. V. Chekin, in their articles appearing in *Izv. Akad Nauk. USSR, Otdel, Tekh, Nauk, Metallurgiya i Toplivo* at 6, 25–29 (1961) and at 1, 56–59 (1962) disclose that the formation of bubbles and slugs in a fluidized bed may be eliminated over a wide range of variation of flow rates by a laterally applied variable magnetic field due to the interaction of this field with fluidized ferromagnetic particles.

U.S. Pat. No. 3,440,731 to Tuthill discloses a process for stabilizing and suppressing bubble formation in a fluidized bed, containing particulate solids having ferromagnetic properties by subjecting the fluidized bed to a magnetic field. While it is disclosed that either an alternating current or a direct current electromagnet may be used, the only example in the patent describes an alternating current electromagnet, thus producing a magnetic field varying with time in direction and intensity.

Numerous publications by Ivanov and coworkers and a publication by Sonoliker et al disclose the application of a magnetic field produced from a direct current (non-time varying) electromagnet to fluidize iron or iron-chromium particles such as used in ammonia synthesis or carbon monoxide conversion. These articles include: Sonoliker et al, *Indian Journal of Technology,* 10, 377–379 (1972); Ivanov et al *Zhurnal Prikladnoi Khimii,* 43, 2200–2204 (1970); Ivanov et al, *Zhurnal Prikladnoi Khimii,* 45, 248–252 (1972); Ivanov et al, *International Chemical Engineering,* 15, 557–560 (1975) (also published in *Chemical Industry,* 11, 856–858 (1975)) and *The Soviet Chemical Industry,* 6, 713–715 (1974); Ivanov et al, *Comptes rendus de l'Academie bulgare des Science,* Tome 25, No. 8, 1053–1056 (1972); and Ivanov et al *Comptes rendus de l'Academie bulgare des Science,* Tome 23, No. 7, 787–790 (1970). In some of the published work of Ivanov and coworkers a gradient applied magnetic field is used to generate body forces to hold fine particles in place and thus permit higher flow rates than in conventional beds. For example, the work reported in British Pat. No. 1,148,513 and Ivanov et al., *Kinet. Katel;* 11, No. 5, 1214-19 (1970) varied the direction of the field from transverse to axial in relation the flow.

In general, the published works of Sonoliker et al and Ivanov et al, teach that higher gas velocities can be used in the presence of an applied magnetic field than in its absence. For example, Ivanov et al. state in *Zhurnal Pikkladnoi Khimii,* 45, 248–252 (1972) at page 251: "Linear gas velocities higher by 30–40% can be used under high pressure in the presence of a magnetic field than in its absence, at the same degree of bed expansion without appreciable breakdown of the bed structure and without transport of particles out of the bed." However, Sonoliker et al and Ivanov et al provide no recognition of the existence of the stably fluidized non-bubbling bed and appear to erroneously interpret the transition from the stably fluidized state to the unstably fluidized (bubbling) state as the transition from fixed to fluidized states. Furthermore, they did not teach the essential role played by orientation and the significance of role played by uniformity of the applied magnetic field. In a uniform applied magnetic field, the bed is free of any net magnetic force.

Workers at the Brookhaven Laboratories, H. Katz and J. T. Sears, *Can. J. Chem. Eng.* 47, 50–53 (1969) described a process for the stabilization of a fluidized bed of dielectric particles by use of an electric field. These workers disclose that glass bead and silica gel particle beds were observed to behave as packed beds at flow rates (and pressure drops) of fluidizing gas up to 15 times the normal incipient fluidization rate. Katz and Sears also disclose in the cited article the use of an imposed axial magnetic field (alternating or unidirectional) to stabilize a bed of iron particles, but indicate that the iron particles under the influence of a strong magnetic field are in the form of a slug.

THE DISCOVERY OF THE PRESENT INVENTION

It has been discovered that by fluidizing a bed containing solid particulate magnetizable and fluidizable material with a fluid such as a gas or liquid in the presence of an applied uniform, time-steady magnetic field oriented parallel with the direction of fluid flow, a stably fluidized bed results over a substantial range of gas velocities.

The basis for the phenomenon is believed to relate to the behavior of magnetic stress in the fluidized medium which is viewed as a homogeneous magnetized continuum. A local perturbation in voidage modifies the uniform magnetic stress of the unperturbed bed creating magnetic forces that tend to restore the medium to the uniform state. A general expression for the magnetic stress tensor is provided in *Ferrohydrodynamics,* Entry in the "Encyclopaedic Dictionary of Physics," Suppl. Vol. 4, by R. E. Rosensweig, Edited by J. Thewlis, Pergamon Press (1971).

SUMMARY OF THE INVENTION

As one embodiment of the present invention there is disclosed a process for fluidizing a bed containing solid particulate magnetizable, fluidizable material and fluidizing fluid located within an external force field wherein at least a portion of said bed containing said solid particulate magnetizable, fluidizable material and fluidizing fluid are subjected to a nontime varying and substantially uniform applied magnetic field having a substantial component along the direction of the external force field such that said solid particulate magnetizable, fluidizable material has a component of magnetization along the direction of the external force field and wherein at least a portion of said bed containing the solid particulate magntizable, fluidizable material is stably fluidized by the flow of fluidizing fluid opposing said external force field at a superficial fluid velocity ranging between:

(a) more than the normal fluidization superficial fluid velocity required to fluidize said bed in the absence of said applied magnetic field; and, (b) less than the superficial gas velocity required to cause time-varying fluctuations of pressure difference through said stably fluidized bed portion over a finite time period during continuous fluidization in the presence of said applied magnetic field. The normal minimum fluidization superficial fluid velocity is the fluid velocity observed when the pressure difference of the fluid passing through the fluidized bed, as measured between the upper and lower surfaces of the bed, is first substantially the same as the bed weight per unit cross-sectional area.

The strength of the magnetic field and its minimal deviation from a colinear orientation to the external force field are maintained so as to prevent and/or suppress formation of bubbles in the fluidized media at a given fluid flow rate and with a selected fluidized particles makeup.

Fluid throughput rates which are up to 10 to 20 or more times the flow rate of the fluidized bed at incipient fluidization in the absence of the applied magnetic field are achieved, concomitant with the substantial absence of bubbles. The magnetically stabilized fluidized bed has the appearance of an expanded fixed bed with no gross solids circulation and very little or no gas bypassing.

DETAILED DESCRIPTION OF THE INVENTION

Figure 1:
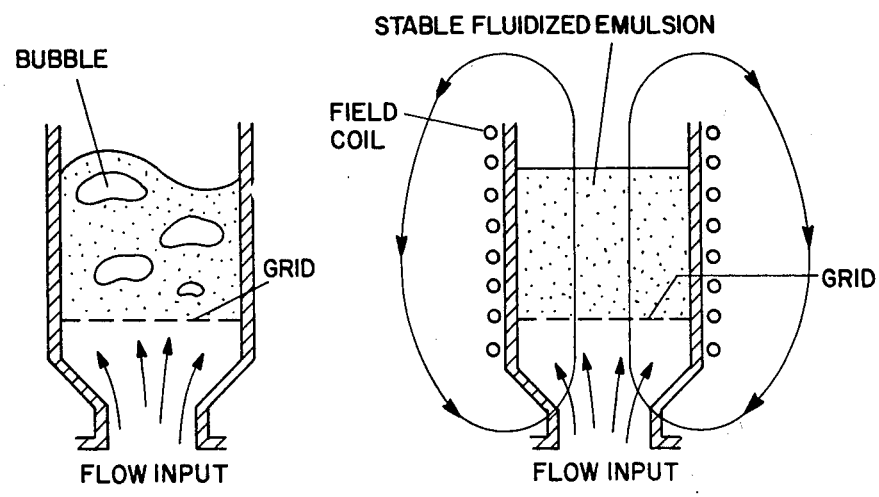
FIG. 1 is a schematic representation comparing the magnetically stabilized fluidized bed of the present invention with an ordinary unstabilized fluidized bed.

As indicated previously, the present invention relates to a process for operating a stably fluidized bed over a substantial range of fluid velocities. Fluid throughput rates which are 2, 5, 10, 15 and 20 or more times the normal minimum fluidization superficial fluid velocity of the bed containing the fluidizable material can be accomplished by the practice of the invention concommitant with substantial absence of gross solids circulation, very little or no gas bypassing and minimal or absence of bed fluctuation. The fluidized bed is stabilized by subjecting at least a portion of the fluidized bed comprising solid particulate magnetizable and fluidizable material and a fluidizing fluid to a nontime varying (direct current) and substantially uniform applied magnetic field having a substantial component along the direction of the external force field (which will generally be gravity) such that the solid particulate magnetizable and fluidizable material has a component of magnetization along the direction of the external force field. As it will be seen from the description of the invention and reference to the drawings, the maximum superficial fluid velocity that can be employed while still maintaining a stable, nonfluctuating bed is a function of the component of magnetization of the solid particulate magnetizable and fluidizable material along the direction of the external force field which is imparted by the applied magnetic field. It is to be recognized that factors such as particle size, particle composition and shape, particle density, length and shape of the bed, etc. each affect the maximum fluidization velocity that can be achieved at a given component of magnetization. The variation and adjustment of these factors will be apparent to those skilled in the art in practicing the process of the present invention.

The process of the instant invention enjoys benefits of solids facilitated for transport and limited pressure drop of a fluidized bed along with absence-of-backmixing normally associated with fixed bed processes.

When fluid is passed upward through a bed of closely sized granular solids, a pressure gradient is required to overcome friction. In order to increase the rate of flow, a greater pressure gradient is required. When the pressure difference (also known as differential pressure and pressure drop $\Delta P_o$) approaches the weight of the bed over a unit cross-sectional area, the solids begin to move. This motion of the solids is created at superficial fluid velocities far below the terminal free-settling velocities of the solid particles and constitutes the beginning of fluidization. Thus, the normal minimum fluidization superficial fluid gaseous or liquid velocity is the fluid velocity observed when the pressure difference of the fluid passing through the fluidized bed, as measured between upper and lower surfaces of the bed, is first substantially the same as the bed weight per unit cross-sectional area. As is well known, superficial fluid velocity is a measure of the linear fluid velocity that would pass through an empty vessel and it is measured in feet per second, centimeters per second, etc. This point of normal minimum fluidization superficial fluid velocity in the absence of an applied magnetic field is the minimum fluidization superficial fluid velocity of the process of the invention.

For solid particulate magnetizable and fluidizable materials, the point of initial or minimum fluidization is not affected by the presence or absence of an applied magnetic field. However, when the minimum superficial fluid velocity is exceeded in a bed which is not subjected to the influence of an applied magnetic field, the porosity of the bed begins to increase and the individual particles move under the influence of the passing fluids concommitant with the formation of bubbles as shown in the left hand sketch of FIG. 1 of the drawings. Such a normally fluidized bed experiences gross solids circulation, gas bypassing, bubble formation, slugging and bed fluctuation. By comparison, with application of a magnetic field in accordance with the practice of the present invention, the bed is stabilized, thereby reducing or eliminating gas bypassing, bubble formation at the region or zone of the uniform magnetic field, slugging and bed fluctuation. Thus, a greater efficiency of fluid-solids contacting can be accomplished by operating the process of the present invention.

As further illustration of the present invention, the phenomenon of normal fluidization can be visualized in terms of a simple experiment by the left hand sketch of FIG. 1 in which a bed of solid particles is supported on a horizontal porous grid in a vertical tube. A fluidizing fluid in the form of a gaseous medium or liquid is then forced to flow upwards through the grid, and so through the particle bed. This flow causes a pressure difference (pressure drop) across the length of the bed, and when this pressure difference is sufficient to support the weight of the particles, the bed is "incipiently fluidized" (the superficial fluid velocity required to attain incipient fluidization is the "normal minimum superficial fluid velocity"). The fluidized bed thus formed has many properties of a liquid; objects float on the surface and the addition or withdrawal of solid particles in process equipment is also facilitated. As shown by the left hand sketch in FIG. 1, a gas-fluidized bed in which the gas velocity is greater than the incipient gas velocity, most of the excess gas passes through the bed as bubbles.

By providing the solids of the bed with magnetizability and applying a uniform, time-steady magnetic field oriented parallel with the direction of gas flow as shown in the right hand sketch in FIG. 1, it has been found that a stabilized non-fluctuating and essentially bubble-free fluidized bed results over a substantial range of superficial gas velocities. As shown in the sketch in FIG. 1, the magnetic field may be conveniently furnished by wound coils carrying a modest direct electric current and surrounding the fluidization vessel.

Figure 3:
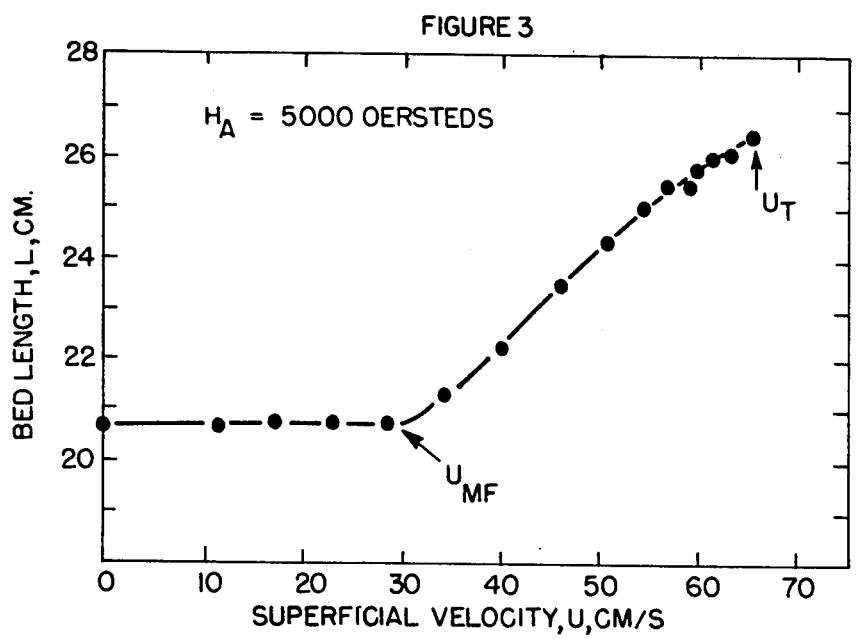
FIG. 3 graphically illustrates the expansion of the magnetically stabilized fluidized bed in response to increasing gas flow at a constant applied magnetic field intensity.

Referring to FIG. 3 of the drawings, there is an illustration of the response of magnetized solids to increase of superficial gas velocity for a constant intensity of applied magnetic field. The solid particles are a closely graded range of nickel-copper alloy (Monel). Measurements of a particulate sample with a vibrating sample magnetometer yield magnetization values of 372 gauss at 5000 oersteds applied field, 326 gauss at 3000 oersteds, 250 gauss at 1000 oersteds and 132 gauss at 200 oersteds. The material is ferromagnetically soft with a remanence of less than 5 gauss. With no gas flow the bed length is that of the randomly dumped solids. The bed comprises 2840 grams of the Monel (copper-nickel alloy) of 177–250 micron particle size and specific gravity of 8.45 in a vessel of 7.57 centimeter diameter with an applied magnetic field intensity of 5000 oersteds that is uniform over the test region to within 1 percent. With a flow of air admitted to the vessel, the bed length is unchanging up to the point of incipient fluidization. Thereafter, the bed accommodates increasing flow by a process of homogeneous expansion in which detectable bubbles are not present in the bed and the bed of solids in gas emulsion is free of fluctuation, agitation or solids circulation. In this stable, calm state, a visual inspection of just the bed fails to reveal its fluid like nature. However, objects are readily immersed into the bed as into a liquid and when released light objects float and dense objects sink. A hollow plastic sphere of 3.72 centimeter diameter weighting 1.94 grams (ping pong ball) when initially rotated continues to spin for several seconds, thus indicating the very low frictional support it experiences when floating partly submerged in the bed emulsion. As the superficial gas velocity (flow rate) is increased further, a point is ultimately reached where bubbling suddenly commences. When the flow rate of gas is slowly increased to the vicinity of the transition point, the bed surface in some instances bubbles over part or all of its area for a limited time, then returns to the motionless state; apparently the medium adjusts to a new structure. A small incremental increase in throughput then produces steady bubbling and bed fluctuation. This flow rate is taken as the experimental transition point. The uncertainty introduced into the reported values in this manner is on the order of 5% or less of the superficial gas velocity. As shown by FIG. 3, this point of transition from the calmed or stabilized state of flow to the state of bubbling and bed fluctuation occurs at substantially higher flow rates than for the unmagnetized bed. As shown in FIG. 3, no expansion occurs until the vicinity of $U_{MF}$, the minimum throughput velocity causing bubbling in the absence of the applied magnetic field. Expansion continues as gas flow increases with no bubbling, bed fluctuation or solids mixing up to the point $U_T$, the transition speed. It was found that the transition velocity increases as the bed length decreases. When this Monel containing expanded bed length is greater than 100 mm, the transition is independent of bed length and exceeds incipient fluidization velocity by a factor of 2.3 at the applied field of 5000 oersteds. At bed length less than 50 mm, the transition speed increases steeply as depth decreases, e.g., 4.6 times greater than the incipient velocity at about 20 mm length. Additional experiments have shown that the transition velocity of a stabilized bed is unaffected by the crosssection dimensions of the containing vessel for tests in which the hydraulic diameter varied from 3 to 28 centimeters.

Figure 2:
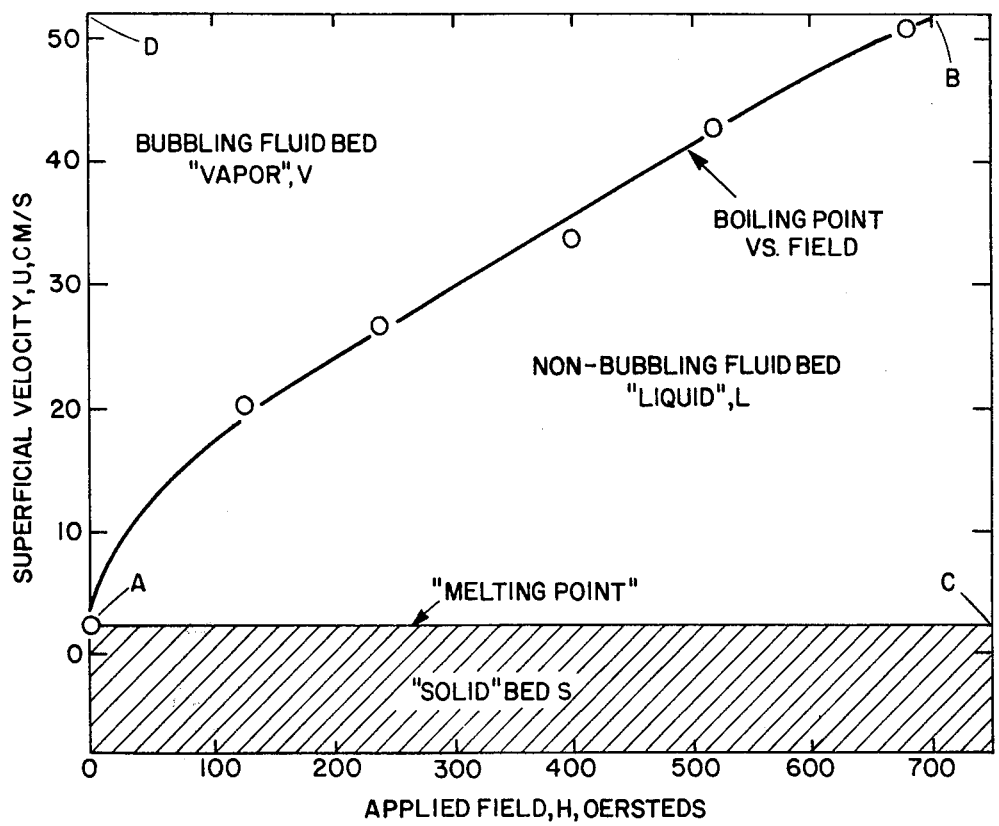
FIG. 2 is a graphical illustration of a three phase diagram displaying (1) the solid unfluidized region, (2) the stabilized, fluidized region (the operating region or zone of the present invention) and (3) the bubbling fluidized region, as a function of applied magnetic field intensity and stabilizing velocity.
Figure 4:
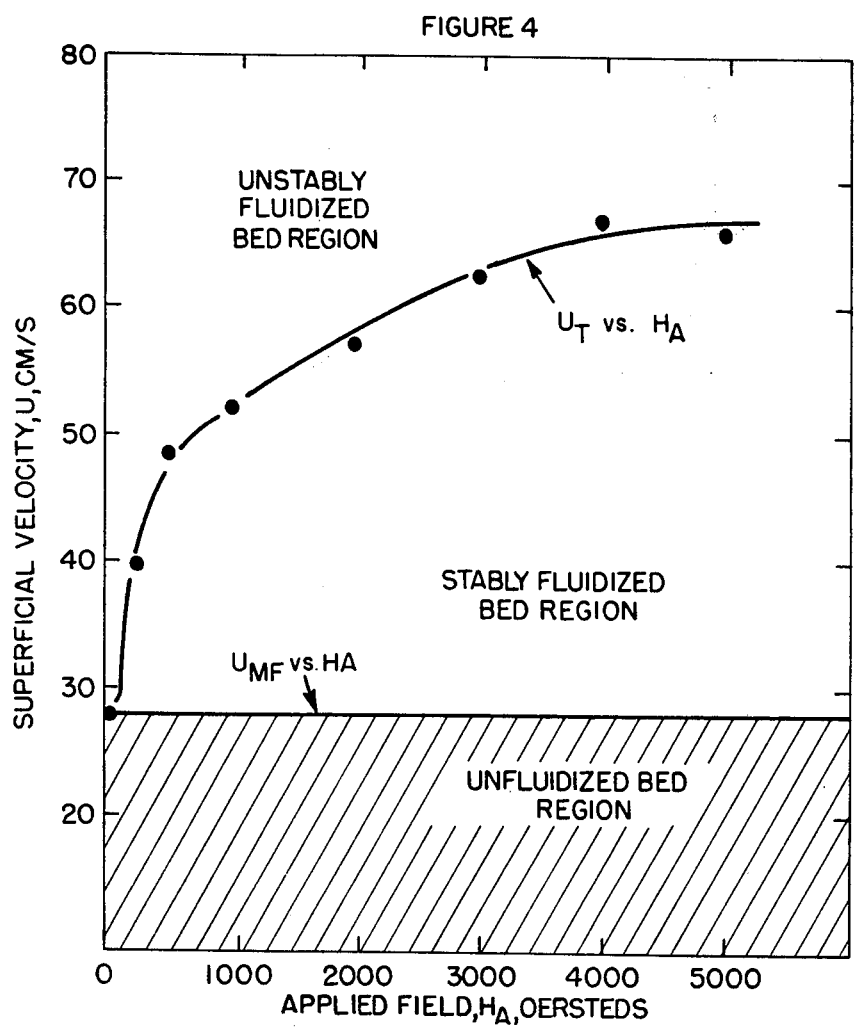
FIG. 4 graphically illustrates the three phase regions, i.e., (1) the solid, unfluidized region, (2) the stabilized fluidized region and (3) the bubbling fluidized region as a function of applied magnetic field intensity. The experimental system in this Figure is the same as used in FIG. 3. The bed depths in this experimental system may be read from FIG. 3.

When the transition velocity is determined by the method described above for a number of different applied field intensities, the results obtained give the plot of FIG. 4 of the drawings (FIG. 2 which is similar to FIG. 4 is discussed further with respect to the examples). The experimental system used to provide the data in FIG. 4 is the same as that used in FIG. 3 described above. The bed depths may be read from FIG. 3. FIG. 3 defines three regions that classify the physical state of the bed emulsion as 'unfluidized', 'stably fluidized,' or 'unstably fluidized.' The boundary between 'stably' and 'unstably fluidized' represents the transition previously while the boundary between 'unfluidized' and 'stably fluidized' states represent incipient fluidization. As will be demonstrated in the Examples, the incipient fluidization is affected little or none by the applied magnetic field intensity. For example, bed pressure difference initially is linear with flow rate, then breaks at the point of incipient fluidization with pressure difference (pressure drop) about constant and closely equal to the bed weight per unit cross-sectional area. The slope of the initial linear portion of the curve is independent of applied field and it is predictable from the low velocity limit of the well known fixed bed Ergun relationship. The invariance of the plateau pressure level to the presence of the applied field verifies the force free nature of the uniform magnetic field. Since the incipient fluidization point corresponds to the intersection of the said two lines, it follows that incipient fluidization is independent of applied magnetic field intensity.

With velocity considered as analog to temperature or agitation influence, and applied field as analog pressure, FIG. 2 and FIG. 4 resemble a thermodynamic phase diagram of a pure substance having solid (unfluidized or fixed bed), liquid (stably fluidized) and vapor (unstably fluidized or boiling) regions. This two phase magnetized flow in effect constitutes an aggregate composition of matter having unique thermodynamic and transport properties.

Uniformity of the emulsion can be inferred from pressure measurements using a capillary tube connected to a manometer and inserted vertically into the bed. It is found that pressure increases linearly with depth implying that voidage is uniform from one layer to the next throughout the bed.

Orifice discharge tests confirm the ability to transfer solids out of the containing vessel. The flow rate of the solids is characterized by a constant value of discharge coefficient independent of applied field intensity or initial depth of the bed. Additional tests using bands of surface pigmented solids as a color tracer demonstrate that solids move through the bed in ideal piston-like motion with no backmixing when a series of eight evenly spaced orifices are simultaneously opened around a circumference of the vessel cylindrical wall a short distance above the support grid. The plug nature of the flow is participated in by all the bed particles, including those adjacent to the wall. In this respect, the bed emulsion behaves as an inviscid medium displaying slip at the wall. At a distance on the order of the vessel diameter above the orifices the flow must devitate from simple one-dimensional motion.

It has been found that orientation of the applied magnetic field is critical in achieving stable flow with the preferred direction colinear or parallel with the direction of flow and hence vertical in these experiments. Experimental tests using a uniform transverse orientation of applied field reveal that fluidization is achieved but bubbling is not prevented, the bubbling occurring at the same throughput rate as in the absence of the applied magnetic field, that is at incipient fluidization. These experiments comprised an applied magnetic field of 570 ± 20 oersteds over a short bed of 150–420 microns nickel-on alumina particles of specific gravity 1.3 with bubbling occurring at 2.8 to 2.6 cm/s with and without the field. Applying 520 oersteds field parallel with the flow deferred transition to the extraordinary value of 43 cm/s; the bed expanded by 68 percent of its initial length.

In putting the present invention into practice, the substantially uniform constant magnetic field is applied to at least a portion or a zone of the fluidized bed containing magnetizable, fluidizable solid particles. The portion of the bed or series of beds to be stabilized may be designed to suit the particular process to use the process of the invention. For example, in some fluidization processes, it may be expedient to stabilize the uppermost 10–40% or 1/3 region or zone of the bed while purposely allowing the remaining region or zone of the bed to be unstable. Alternatively, the fluidization vessel may be disposed of separate and discrete sections, at least one of which is stabilized by the process of the present invention. In both of such instances, it is preferred that the region is stabilized by the applied magnetic field having a variation of its vertical component that does not exceed 25% of the average vertical component over the region or zone of the bed to be stabilized, said region containing the particulate magnetizable and fluidizable material. Preferably, the magnetic intensity will vary no more than 10% and more preferably no more than 5% over the stabilized region. Often, it will be deemed desirable to design such regions or zones to have only about a 5% or less variance.

In many processes it will be desirable that the entire fluidized bed in a fluidization vessel be stabilized in accordance with the teachings of the present invention. In such cases, the widest range of stable behavior of the fluidized medium is obtained when the applied magnetic field is substantially uniform throughout the entire bed containing the magnetizable and fluidizable solid particles. Thus, when the magnetic field is applied having a substantial vertical component to stabilize the fluidized medium, the variation of the vertical component of the magnetic field to the mean field in the bed must be no greater than 50%, and most preferably no greater than 10%. Often, such fluidization units will be designed to have a less than 5% variation over the mean.

As demonstrated in Table IX, Example 7 below, it has been unexpectedly found that nontime varying vertical fields are preferred and provide advantages over time varying fields, that is direct current (DC) rather than an alternating current (AC) is used to energize the electromagnet positioned to provide the vertically oriented magnetic field. Another advantage of uniform field is reduction of magnet power. Because the power requirements for a given mean field are less with more uniform magnetic fields, it is preferred that variation of the varying magnetic field to the mean field in the bed be no more than 100%, more preferably less than 50%, and most preferably less than 10%.

Generally, it will be shown that the greater the uniformity of the applied field, the greater will be the tendency to form a homogeneous bed medium and one which yields the greatest value of transition velocity. This fact furnishes the primary reason for utilizing uniform fields. Certain specific adverse influences of nonuniform field distribution are illustrated in Examples 3, 6 and 8 below.

A spatially uniform DC field having a superposed AC component behaves substantially as a DC field provided the DC field intensity is substantially greater than the amplitude of the AC field component.

The solid particulate magnetizable and fluidizable particles to be used in the practice of the present invention are preferably particles having a low or zero coercivity. All ferromagnetic and ferrimagnetic substances, including but not limited to magnetic $Fe_3O_4$, $\gamma$-iron oxide ($Fe_2O_3$), ferrites of the form $XO.Fe_2O_3$, wherein X is a metal or mixture of metals such as Zn, Mn, Cu, etc.,; ferromagnetic elements including iron, nickel, cobalt and gadolinium, alloys of ferromagnetic elements, etc. may be used as the magnetizable and fluidizable particulate solids. Other non-magnetic materials may be coated with and/or contain dispersed therein solids having the quality of ferromagnetism. For example, composites of magnetizable and fluidizable solid particulates, for example in some catalytic processes may contain from 2 to 40 volume percent and preferably 5 to 20 volume percent and more preferably 10–15 volume percent of the ferro- or ferrimagnetic material and the balance of the composite will be comprised of nonmagnetic material. Often it will be desirable to use a ferro- or ferrimagnetic composite with a nonmagnetic catalytic material. The fluidized bed containing the composites may also include particulate solids which are nonmagnetizable. In other processes it may be desirable to use 100% ferro- or ferrimagnetic materials as the particulate solids.

An important factor in selecting or preparing the magnetizable and fluidizable particulate solids is the magnetization M of the particle. The higher the magnetization M of the particle, the higher will be the transition velocity $U_T$ up to which the bed may be operated without bubbling and bed fluctuation, all other factors such as particle size and distribution being held constant. The magnetization of the magnetizable and fluidizable particles in the medium will have a magnetization M of at least 10 gauss. Generally for high fluid velocities, the particles will have a magnetization, as being imparted by the applied magnetic field, of at least 50 gauss, preferably at least 100 gauss and more preferably at least about 150 gauss, e.g., 150–400 gauss. For those processes requiring very high fluid velocities, the magnetization of the magnetizable, fluidizable particles may be up to about 1000 gauss or more, but preferably 150–450 gauss.

The magnetization M of the particles, as is well known, is defined as B-H in the particle, where B is the magnetic induction and H is the magnetic field, the fields being defined in standard published works in electromagnetism, e.g., *Electromagnetic Theory*, J. A. Stratton, McGraw-Hill (1941). The value of M may be measured in a variety of ways, all of which give the same value M since M has an objective reality.

One means for determining magnetization M of the particles in a bed under the influence of a given applied magnetic field is to measure their magnetic moment at that field in a vibrating sample magnetometer under conditions of similar voidage, sample geometry and temperatures as exist in the process to be used. The magnetometer gives a value of σ, the magnetic moment per gram from which magnetization M is obtained from the formula:

$$M = 4 \pi \rho \sigma$$

where ρ is the density of the particles in the test sample, σ is the magnetic moment in emu/g and M is the magnetization of the particles in gauss at the applied magnetic field tested.

Thus, it can be seen from the above discussion that the fluid velocity region of stable operation is potentially expanded with increasing magnetization of the particles. The actual magnetization of the particles in the fluidization vessel will be a function of the particles themselves (the degree of magnetizability they inherently possess) and the intensity of the applied magnetic field.

As stated above the magnetizable particles should have a certain degree of magnetization M which is imparted to the particles by the intensity of the applied magnetic field. Obviously one would seek the lowest applied magnetic field possible because of cost. Commonly many of the composite particles will require at least 50 oersteds, more often more than 100 and preferably less than 1000 oersteds to achieve the requisite magnetization M. The determination of the applied magnetic field will take into account the type of particles fluidized, i.e., their magnetization, particle size and distribution, the fluid velocity to be used, etc.

As stated earlier the magnetizable and fluidizable particles may be admixed with nonmagnetic materials. For example, silica, alumina, metals, catalysts, coal, etc. may be admixed with the magnetizable and fluidizable particles and the advantages of the present invention still obtained. In the case of admixtures (as opposed to composite materials containing the magnetizable particles) it is preferred that the volume fraction of magnetizable particles exceed 25 percent, more preferably exceed 50 volume percent. Often the bed will be comprised of 100 volume percent of the magnetizable and fluidizable particles (i.e., it will not contain admixtures of other materials). When the nonmagnetizable admixture exceeds 75 volume percent, the particle mixtures may separate analogous to liquids of limited solubility.

The particle size of the fluidizable and magnetizable particles will range from about 0.001 mm to 50 mm, more preferably from 0.05 to 1 mm. Often the particle size will range from about 0.05 to 0.5 mm, preferably from 0.1 to 0.4 mm and more preferably from 0.2 to 0.35 mm. The particle size range referred to herein is that determined by the mesh openings of a first sieve through which the particles pass and a second sieve on which the particles are retained.

The superficial fluid velocity to be used in practicing the invention will be more than the normal minimum fluidization superficial fluid velocity of the bed containing the solid particulate magnetizable and fluidizable material in the absence of the applied magnetic field. Preferably the superficial fluid velocity will be at least 10% above the normal minimum fluidization superficial fluid velocity of the bed containing the solid particulate magnetizable and fluidizable material in the absence of the applied magnetic field. In some instances it will be desirable to operate the process at more than 2, 5, 10, 15 and 20 or more, and quite often 2 to 10 times the normal minimum fluidization superficial fluid velocity required to fluidize the bed containing the solid particulate magnetizable, fluidizable materials in the absence of the applied magnetic field.

As the transition superficial velocities are increased the component of magnetization of the solid particulate magnetizable and fluidizable material along the direction of the external force field will have to be increased so as to prevent time-varying fluctuations of pressure difference through the bed during continuous fluidization. It will be recognized that particles of high magnetization such as iron and steel can achieve a very high component of magnetization M at relatively low applied magnetic fields. These particles, however, have the limitation that at applied magnetic fields, e.g., above 50 or 100 oersteds, the particles tend to aggregate and take the form of a slug. Consequently, the level of superficial fluidization velocity that can be achieved with such particles is limited while still maintaining a non-fluctuating bed. The maximum useful levels for the magnetization M of most particles must be limited to about 500 to 1000 gauss in order to achieve a reasonably fluid-like bed medium without undue agglomeration of particles. It can be calculated that for iron spheres (which is approximately similar to particulates used by Sonoliker et al. and Ivanov et al.) in a bed subjected to an applied field of 50 oersteds the maximum magnetization M of bed particle is about 300 gauss. However, it will be recognized that at points of contact of the particles, the magnetization can be far greater and hence the magnetic forces of agglomeration are greater.

The occurrence of bed fluctuation as referred to herein furnishes a means of determining the transition superficial fluid velocity. For example, fluctuation of a fluidized bed can be determined by a variety of techniques which measure the fluctuation of a bed property. Thus, bed length fluctuation can be ascertained by a Hall probe placed in said bed, by reflection of a light beam, etc. A convenient means for detecting bed fluctuation is by determining the pressure difference through the bed containing the solid particulate magnetizable and fluidizable particles. For present purposes a time-varying fluctuation of pressure difference through the stably fluidized bed portion will be taken as indicative that the superficial fluid velocity has caused that portion of the bed to go into the unstable region as shown in FIGS. 2 and 4, i.e., the region beyond $U_T$. Preferably, the superficial fluid velocity will be less than 98% and more preferably less than 85% of the superficial fluid velocity necessary to cause fluctuations of the stably fluidized bed-portion pressure-difference. A fluctuation in the pressure difference in the bed is indicative of bubble formation, and it is the intent of the present invention to operate a fluidized bed in the substantial absence of bubbles. It will be recognized, of course, that a non-fluctuating fluidized bed in accordance with the practice of the present invention may contain some localized bubbles which are dissipated by the effect of the magnetic field to thereby cause bed stabilization. Such bubbles may be due to the presence of distribution means for introducing or removing fluids or solids from the fluidization vessel, the presence of obstructions of the flow, momentary pulses in flow rate of the solids or fluid in the vessel etc. In any event, the superficial fluid velocity should be controlled or monitored such that it is less than the superficial fluid velocity required to cause time-varying fluctuations of pressure difference through the stably fluidized bed portion over a finite period of time, e.g., 0.1 to 1, preferably 1 to 10 seconds, and more preferably 10 to 100 second intervals during continuous fluidization. The term fluctuations of pressure difference through the stably fluidized bed portion, as referred to herein, is meant to be restricted to those fluctuations attributed to the fluidization process itself as a result of the fluid, i.e., gaseous material causing the fluidization, and not external sources of vibrations which may cause minor fluctuations of pressure readings, e.g., motors, fans, pumps, or due to the grid in the bed, etc.

In determining the pressure difference through the stably fluidized bed portion as defined herein, it is meant to include those measurements taken in the uppermost region or zone of the stably fluidized bed, i.e., the uppermost 20%, preferably uppermost ⅓ and more preferably uppermost 40% region or zone that is stably fluidized. Thus, in testing for fluctuations in pressure through the stably fluidized bed portion, one can determine these fluctuations if any, by measurement of differential pressure and its fluctuation between two pressure taps, one located above the top surface of the bed and a second one located 20%, ⅓ or 40% below the top surface of the stably fluidized bed portion. In those cases where it is desired to obtain a stably fluidized bed portion at the lowermost region of the entire fluidized bed, the measurements would obviously be taken at this portion of the bed, i.e., one pressure tap at the grid and the other pressure tap 20%, ⅓ or 40% above the grid. Additionally, where the stably fluidized bed portion is centrally located, one can determine the differential pressure and its fluctuation, if any, between two pressure taps, one located 10%, preferably and more preferably about 1/6 and more preferably 20% of the total bed length above the center of the entire fluidized bed and the other pressure tap located an equal distance below the center.

The ratio of root mean square (rms) to mean value of pressure difference through the bed as detected by a pressure probe furnishes a convenient means to measure the presence of fluctuation within the bed.

Letting $\Delta P_1$ be denoted as the difference between $\Delta P$ and $\Delta P_o$ where $\Delta P$ is the instantaneous value of pressure difference through the bed and $\Delta P_o$ is the time mean value of pressure difference through the bed, then the quantity $\Delta P_{rms}$ defined as follows is the "rms" value of pressure fluctuation $$\Delta P_{rms} = \left\{ [\frac{1}{T} \int_0^T (\Delta P_1)^2 dt]_{T \to \infty} \right\}^{\frac{1}{2}}$$

Thus the ratio of rms fluctuation to the mean is given as $\Delta P_{rms}/\Delta P_o$. As a practical matter, the averaging time T need only be taken as about 10 to 100 seconds duration of continuous fluidization. Preferably, in the operation of the instant process the flow of the fluidizing fluid is not substantially more than about 98%, more preferably 95% and still more preferably 85% of the superficial fluid velocity required to cause a 0.1% ratio of root mean square fluctuation of pressure difference to mean-pressure difference through the bed during continuous fluidization.

It is to be understood that the value of 0.1% is not to be construed as those attributed to fluctuations of pressure difference readings due to the grid, distributor means for introducing or removing fluids or solids from the fluidization vessel, etc.

THEORY OF THE INVENTION

While not wishing to be bound by any theory, the following theoretical explanation is offered for the purpose of further illustration of the invention.

Hydrodynamic stability analysis has revealed that the uniformly magnetized medium in a long bed undergoes transition from the stably fluidized state in which there is no bubbling to the unstable bubbling state of motion under conditions specified by the following stability criterion which has been derived.

| | | |
|---|---|---|
| $N_M N_v$ | $>1$ | unstable |
| | $<1$ | stable |

The criterion for stability when met ensures that chance disturbance of voidages in the medium will decay so that uniformity of the medium is preserved. $N_M$ and $N_v$ are dimensionless groups having the following definitions:

$$N_M = \frac{\rho U^2}{M^2}$$

and $$N_v = \frac{4\pi(4-3\epsilon_o)^2}{\epsilon_o^2(1-\epsilon_o)} [1+(1-\epsilon_o)X_o-(1-\epsilon_o)(X_o-\hat{X})\cos^2\theta] \frac{\cos^2\gamma}{\cos^2\theta}$$

$N_M$ represents a ratio of kinetic energy to magnetostatic energy of the bed solid; $\rho$ is particle density (g/cm³), U the gas superficial velocity (cm/s), and M denotes solids magnetization (gauss). M is a function of applied field H attaining a saturation value at high levels of applied field. $N_v$, the voidage modulus, depends on the voidage fraction $\epsilon_o$, the chord susceptibility $X_o = M/H$, the tangent susceptibility $\hat{\chi} = \delta M/\delta H$, the angle $\gamma$ between the direction of flow and the direction of a wave disturbance and the orientation of magnetic field relative to the disturbance wave as specified by the angle $\theta$.

For disturbance waves oriented along the direction of flow $\cos \gamma$ is unity and $N_v$ takes on its greatest value, all other parameters held constant. Concomitantly, $N_M$ takes on its least value at the point of transition, so for a particle having given density $\rho$ and magnetization M, the velocity of througput U is then at a least value. Thus, the axial orientation of disturbance waves is the most dangerous orientation.

With $\cos \gamma$ set equal to unity the further influence of field orientation may then be noted from the functional form of $N_v$. Thus, field applied transversely to the direction of flow and hence corresponding to $\cos \theta$ of zero yields an infinite value of $N_v$. In that case there is no finite value of $N_M$ which can satisfy the stability criterion, hence: transversely oriented field cannot stabilize the bed. The least value of $N_v$, all other parameters held constant, obtains with $\cos \theta$ of unity. Hence, the preferred orientation of magnetic field is parallel with the flow direction, that is, vertically oriented. The stability criterion discussed above relates to a modelled bed of unbounded extent. Observed throughputs for actual bounded beds range from "equal to" to "greater than" the estimate of throughput provided by the said criterion. Hence it will be understood that the instant invention is not meant to be limited by the said criterion.

Ideally the magnetic field should be uniform throughout the bulk of the bed containing the matter. A uniform field exerts no net force on an isolated single particle or a whole bed of particles. The stabilization of matter achieved in the instant invention is due to local gradient field magnetic forces originating within the bulk matter in response to inhomogeneities in bulk matter distribution that may occur. In practice, any actual applied field will possess nonuniformities. A sufficiently uniform state of the stabilized matter when stabilization exists may be insured by requiring systematic forces of magnetic origin to be sufficiently small.

In seeking a universal description of the magnetic transition phenomenon in the bed of stationary solids, analytical model study as well as dimensional reasoning lead to the conclusion that for a long bed of magnetically saturated solids fluidized by a gas of negligible density the transition speed $U_T$ (cm/s), particle density $\rho$ (gm/cm$^3$), magnetization M (gauss) and bed voidage $\epsilon_o$ are functionally related as follows:

$$N_m = f(\epsilon_o)$$

Here $N_m$ is a dimensionless magnetic modulus representing a ratio of kinetic energy to magnetostatic field energy having the following definition:

$$N_m = \rho U^2/M^2$$

Figure 7:
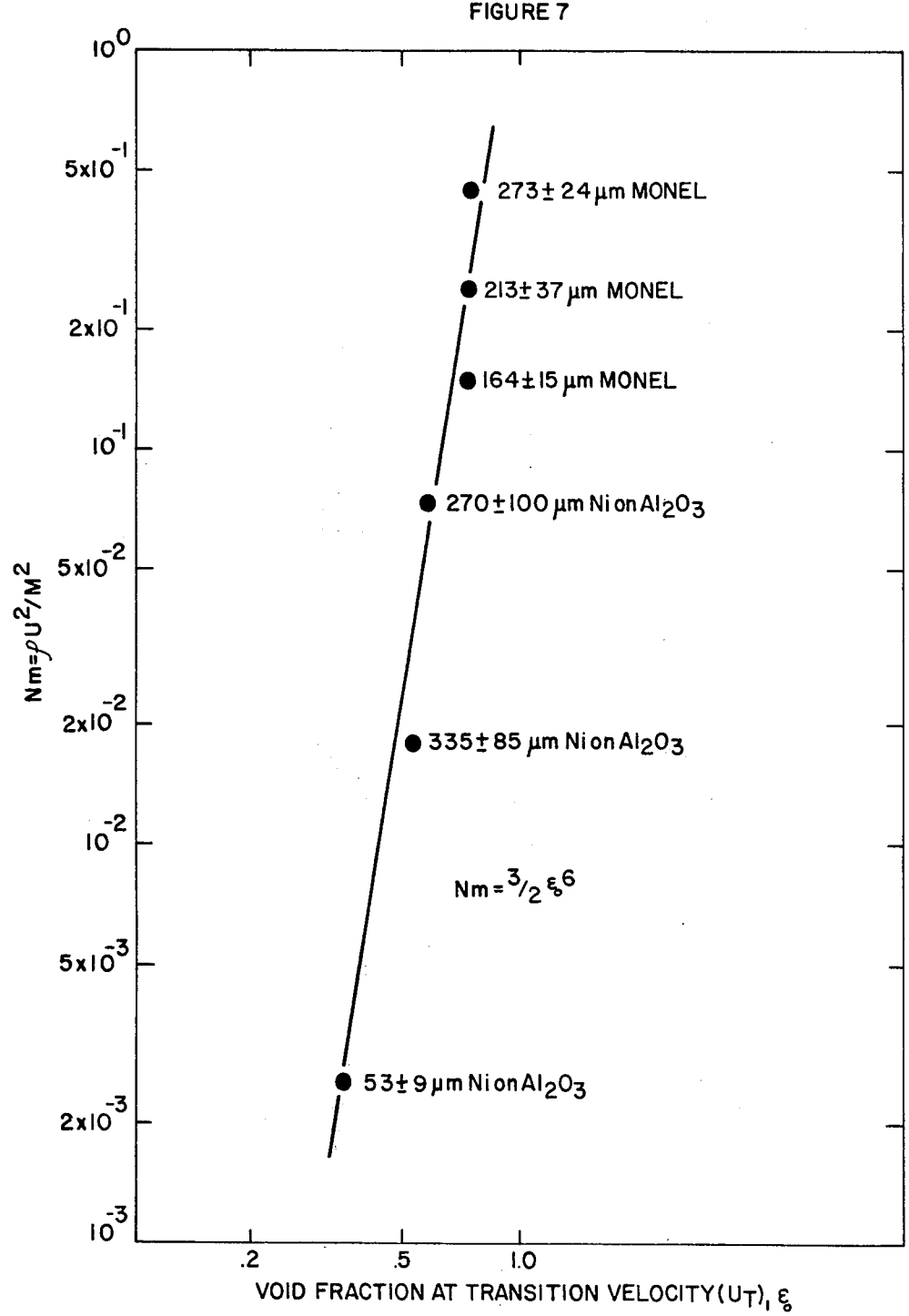
FIG. 7 illustrates a correlation of transition modulus $N_m$ with transition velocity voidage $\epsilon_o$ which supports the conclusion of dimensional reasoning that a unique relationship exists between these two variables for magnetically saturated, long beds. The supported nickel material has a density of 1.30 g/cm$^3$ and a magnetization of 5000 oersteds at an applied field of 228 gauss.

Date for media 163, 274 and 335$\mu$ Monel, and 53, 270 and 335$\mu$ supported nickel in which voidage varies from 0.35 to 0.76 shown in the plot of FIG. 7 support the above deduction and are approximately correlated by the simple expression $f(\epsilon_o) = (3/2) \epsilon_o^6$ so that $N_m = 3/2 \epsilon_o^6$.

Referring again to FIG. 7, there is described the correlation of transition modulus $N_m$ with transition voidage $\epsilon_o$ which supports the theoretical conclusion of dimensional reasoning that a unique relationship exists between these two variables for magnetically saturated, long beds. The supported nickel material has a density of 1.30 g/cm$^3$ and magnetization at 5000 oersteds applied magnetic field of 228 gauss.

USES OF THE MAGNETICALLY STABILIZED FLUIDIZED BED

The fluidization process of the present invention may be advantageously be used in various applications, including but not limited to catalytic cracking, fluid hydroforming, isomerization, coking, polymerization, hydrofining, alkylation, partial oxidation, chlorination, dehydrogenation, desulfurization or reduction, gasification of coal, fluid bed combustion of coal, retorting of oil shale, etc. In any of the above processes, the advantages of calm flow may be realized when the composition of matter of the instant invention is employed in the said process.

In general, it has been discovered that the instant invention for preparing stabilized, fluidized matter can readily be carried out in a fluidized bed reactor comprising a vessel for containing the bed, a bed made up of fluidizable particulate solids, said particulate solids including a plurality of separate, discrete magnetizable particles, a bed fluidizing medium, preferably a gas, and means for generating a magnetic field operably connected to said vessel in such a manner that the magnetic field permeates substantially the total volume of said fluidized bed, is of a uniform nature, and is oriented with a substantial vertical component to the flow of fluid through said fluidized bed.

It is also found that the stabilized bed of the present invention functions as an effective filter to remove contaminant particulates from a gas stream. The efficiency for collection of flyash in a 10 centimeter length stabilized filter bed of 250–420 micron magnetite particles as measured by an Anderson impactor was found to be 99.9% and greater for particulates of 4 microns and larger, and 95% for particulates of 2.1 microns. An applied field of 150 oersteds with superficial gas velocity of 60 cm/s was used. Due to the fluidized state of the bed, the pressure drop remains nearly constant in operation even upon collecting several weight percent of fines. When the bed is loaded with fines, the contents of the bed may be removed from the applied magnetic field to remove the fines and the magnetizable and fluidizable particles can be reused.

The stably fluidized bed of the present invention is useful in removing particulate matter from fluid streams, including when the magnetic moment of the particulate matter times the magnetic moment of the solid particulate fluidizable, magnetizable material is less than 50(emu/gr)$^2$. At these conditions the particulate matter is retained in the stably fluidized bed, while the fluid stream is substantially devoid of the particulate matter which passes through the stably fluidized bed. This embodiment of the invention is especially useful in treating gas streams resulting from coal gasification processes, coal combustion, removal of particulates from boiler flue gases, removal of dust from agricultural processes, blast furnaces and ore smelting, in petroleum processing, oil shale conversion, tar sand processing and other processes. Particulate matter removal using the stably fluidized bed of the present invention is more effective than prior art processes for removal of fine particulate matter down to sizes of less than 2 microns. In a preferred embodiment of this aspect of the invention, the solid particulate fluidizable, magnetizable material along with the particulate matter filtered from the fluid stream are continuously removed from the scrubber vessel in which it is contained and passed into a second vessel wherein said particulate matter is separated from the solid particulate fluidizable, magnetizable material, for example by elutriating said particulate matter in the absence of an applied magnetic field. The particulate fluidizable, magnetizable material is then returned to the scrubber vessel. In one mode of operation of this aspect of the invention, the scrubbing process takes place simultaneously with a chemical reaction of absorption of pollutants from a gaseous fluid stream. As an example, a gaseous stream containing SO$_x$ and particulate matter convert the SO$_x$ in the presence of carbon to elemental sulfur plus carbon dioxide in said fluidized bed at conditions wherein the particulate matter as well as any sulfur and/or carbon is retained in said bed while carbon dioxide passes through.

The following examples serve to more fully describe the manner of making and using the above-described invention, as well as to set forth the best modes contemplated for carrying out various aspects of the invention. It is understood that these examples in no way serve to limit the true scope of this invention, but rather are presented for illustrative purposes. It will be understood that all proportions are in parts by weight, unless otherwise indicated.

EXAMPLE 1

Ten grams of a ferromagnetic nickel-containing catalyst supplied commercially by Chemetron Corporation and known as Girdler G87RS was charged to an open-topped rectangular fluidization chamber having inner dimensions of one inch by one and one-half inches over the cross section, and a height of six inches above a porous bronze support grid. The catalyst had been crushed and sized by screening to the range 0.15 to 0.42 millimeters. The catalyst is 40 wt. % nickel on a support with the nickel prereduced and stabilized by the manufacturer. The dumped height of the solids was 22 millimeters.

Coaxially surrounding the bed was an electromagnet comprising two field coils operating on direct current, wired in series and producing field in a common direction, both coils having an inner diameter of six inches and square cross section of wound conductor of four inches, with face-to-face separation of the coils of 1.5 inches. The coils provided a uniform, axially oriented field of 80 oersteds per ampere over a six inch length of test region. The field was probed with a Hall gaussmeter and it was established that over the test region the field was uniform within ±5% of the mean value axially, and within ±1% over cross sections transverse to the flow direction. The midplane of the coils was located 40 mm above the top of the bed support grid.

With no current supplied to the coil, hence at effectively zero applied field, the bed of catalyst particles exhibited incipient fluidization at a superficial velocity, i.e. volumetric flow rate divided by empty column cross section of 2.6 cm/s. Before the superficial velocity was increased to 2.7 cm/s the bed bubbled continuously. Thus, the unmagnetized bed exhibits virtually no range of operation while in the fluidized state in which bubbles are absent.

In the test described above, the point of incipient fluidization was determined by measurement of pressure differential across the bed as determined by an oil manometer connected to a pressure tap below the bed support grid and the readings corrected for the grid pressure differential determined without particles in the chamber. In this manner, it was established that the pressure differential multiplied by the bed cross-section area and divided by the weight of the bed particles equalled unity in consistent units, as it should, at incipient fluidization, and that the pressure differential passed through a calculus maximum and then remained substantially constant at increasing flow rates.

The magnetic field was applied to the bed and the flow rate of air increased from zero until the point where bubbling began, as determined by visual observation. Transition to the bubbling state occurred at a definite value of flow that is reproducible for each value of applied field intensity. A set of values determined in this manner is given below as Table I.

TABLE I

| Applied Field Oersteds | Transition Superficial Velocity, cm/s | Bed Depth, mm |
|---|---|---|
| 0 | 2.6 | 23 |
| 125 | 21 | 29 |
| 280 | 27 | 34 |
| 400 | 34 | 36 |
| 520 | 43 | 37 |
| 680 | 51 | 37 |

From Table I it is seen that increase of the magnetic field increased the flow rate at which transition to the bubbling state occurred. At the maximum applied field employed of 680 oersteds, the transition flow rate of air was 19.6 times greater through the magnetically stabilized medium than through the medium of the unmagnetized, incipiently fluidized bed.

At flow rates intermediate to the incipient fluidization rate of 2.6 cm/s and the transitional rates given in Table I, light objects, e.g., a cork stopper or a hollow celluloid ball floated when placed in such beds. These objects, when submerged in a bed and then released, instantly were buoyed to the bed top surface, proving the fluidized condition of the bed in the absence of bubbling. Additionally, the ball, when spun, continued its rotation for several seconds, demonstrating a low level of frictional torque associated with the fluidized matter in this stabilized mode of aggregation.

As flow is increased through the stabilized matter, the beds expand to a remarkable degree. Maximum expansion of the stabilized bed at the various applied field levels is given in the last column of Table I. The bed exhibited an expansion of up to 66% of its as-dumped depth. Deep beds are less expansive than shallow beds.

The instant invention comprises a new composition of matter exhibiting unique properties. FIG. 2 illustrates analog thermodynamic properties in the form of a phase diagram. The ordinate U representing superficial velocity, cm/sec or agitating influence is the analog of thermodynamic temperature T while the abscissa giving field intensities H is the analog of thermodynamic pressure P. For concreteness, data of Table I are employed to plot curve AB which represents values of superficial velocity at the point of transition from the stable "liquid" state L to the bubbling "vapor" state V. Thus, AB is analogous to the boiling point curve of a true liquid and the hydrodynamic neutral stability criterion giving $N_M N_V$ of unity is the analog of the Clausius-Clapeyron relationship for thermodynamic phase change. Line AC represents the minimum fluidization speed and demarcates the region of fixed bed or solid analog region S from the liquid analog region L. Thus line AC is analogous to a melting point curve. The line from zero through A towards D represents normal fluidization in the absence of field with bubbling occurring virtually at the point of fluidization A, there being no range of stable operation. Operation at any field intensity with downward flow insures attainment of the "solid" state S or fixed bed condition. Thus it is seen that region L represents a broad new regime within which the new composition obtains and which offers a novel medium heretofore unavailable for the contacting of gases with solids and for other technological tasks.

The new composition has a uniform bulk density and reference to column three of Table I illustrates that unlike normal fluidized matter the bulk density may be continuously adjusted simply by varying the flow rate of the fluidizing gas.

Transport properties of the new composition are unique as well. For example, heat conductivity is far lower than for normal fluidized matter. At the transition point the matter undergoes a change in the nature of a phase change becoming bubbling fluidized matter possessing dramatic increase in heat conductivity. Many other examples could be cited of distinctive properties such as the rheological properties, electrical properties and so forth.

Later in Example 4 it is demonstrated that unlike normal fluidized matter but like a true liquid the matter of region L shows limited solubility effects.

EXAMPLE 2

In this example the direction of the magnetic field was transverse to the direction of air flow. The field was provided by a pair of ceramic permanent magnet plates having pole face dimensions of 6 inches by 3 inches and each a thickness of ½ inch. Spaced 1½ inches from face to face, these magnets produced a uniform magnetic field of 570 ± 20 oersteds over the test region. The mid-plane of the magnetic plates was located 1 inch above the bed support grid.

The bed and bed solids were the same as in Example 1.

The response of this bed to increasing air flow rate is given in Table II below.

TABLE II
TRANSVERSE ORIENTATION OF FIELD

| Field Intensity, Oersteds | Superficial Flow Rate, cm/s | Bed Depth, mm | Fluid-ization | Bub-bling |
|---|---|---|---|---|
| 570 | 0 | 22 | No | No |
| 570 | 0.6$^{(a)}$ | 25 | Yes | No |
| 570 | 1.2 | 26 | Yes | No |
| 570 | 1.8 | 28 | Yes | No |
| 570 | 2.8$^{(b)}$ | 29 | Yes | Yes |

$^{(a)}$The bed was levitated or fluidized as evidenced by the expansion of the bed but the bed medium failed to float a test cork.
$^{(b)}$The bed exhibited violent slugging with chaotic flow at flow rates in excess of 2.8 cm/sec.

From Table II it may be seen that, in common with the case of Example 1 wherein the field was vertically oriented, the magnetized bed expands a great deal in response to increasing flow of the support gas, air.

Had the field of 570 oersteds been applied in the axial direction, the results of Example 1 indicate by interpolation that transition to bubbling would not occur until flow rate equalled 45.5 cm/s, a flow rate that is 16 times greater than the flow rate at which bubbling actually occurred.

At all higher rates of flow in excess of 2.8 cm/s the bed exhibited violent slugging with chaotic flow. At all flow rates of less than 2.8 cm/s the bed medium failed to float a test cork.

In accord with well-known principles of physics, a single magnetizable particle placed in a uniform magnetic field experiences no net force. In order to experience a force, a magnetizable particle must be subjected to a gradient of applied field magnitude. The instant invention preferably employs uniform applied magnetic field. As the result, when voidage nonuniformity tends to develop in the medium, the uniformity of the field is perturbed locally, and field gradients created that exert corrective forces returning the medium to its initial state of uniformity.

Gradient magnetic field in the horizontal direction can prevent the medium from achieving the state of fluidization, as illustrated in Example 3.

EXAMPLE 3

Effect of Transverse Magnetic Field Gradients

The 1 inch × 1½ inch × 6 inch fluidization chamber with the G87RS bed particles of Example 1 was subjected to the magnetic field of a ceramic permanent magnet having the dimensions 2 inch × 1 inch × ⅜ inch with the direction of magnetization through the ⅜ inch dimension. The magnetic field of the magnet is given in Table III for various positions along the perpendicular from the center of the magnet's 2 inch by 1 inch pole face. The variation of magnetic field in the transverse direction across the bed is about 168% relative to the mean field.

TABLE III

| Position, s (¼ in) | Magnetic Field, H Oersteds |
|---|---|
| 0 | 420 |
| 1 | 340 |
| 2 | 220 |
| 3 | 150 |
| 4 | 90 |

In the range of positions given, the gradient of field is nearly constant, producing a maximum body force in the direction transverse to the flow of about 1.3 times the force of gravity. This force ratio was computed from the relationship $(4\pi\rho g)^{-1} M dH/ds$ with $g = 980$ cm/s$^2$, $\rho = 1.3$ g/cm$^3$, $dH/ds$ in units of oersteds/cm, assuming the value $M = 168$ gauss.

The magnet's 2 inch × 1 inch pole face was stationed in juxtaposition with the outside of ¼ inch thick walls of the vessel, at various stations along the bed bulk. As the result, fluidization was prevented at all flow rates over the range 0 to 60 cm/s. The nonuniform applied magnetic field locked the particles against each other and the container wall, preventing fluidization.

The utility of the magnetically stabilized composition is expanded using admixtures of magnetizable solids with nonmagnetizable particulates as shown in the next example. In the instant invention there is minimum tendency for the particles to segregate due to magnetic attraction of the applied field since the applied field is specified as preferably uniform. As a result, mixtures may be fluidized and stabilized, exhibiting the transition behavior and bed expansion properties. Thus, such mixtures may be employed in stabilized bed processes in addition to beds comprised of all magnetic particles.

EXAMPLE 4

Admixtures were prepared of the nickel impregnated catalyst having a particle size range determined by screening of 0.18 to 0.25 mm with a zeolite cracking catalyst having particle sizes less than 0.07 mm. The admixture was placed into the fluidization vessel described in Example 1 to a typical depth of 25 mm. The field source of Example 1 was utilized to provide specified levels of applied magnetic field. Flow rate and bed expansion at the transition from the stably fluidized condition to the bubbling condition were noted. Results of the tests are given in Tables IV and V below.

TABLE IV
Transition Velocity of Admixtures (cm/s)

| Wt.% Magnetics | Applied Field (Oersteds) | | | | |
|---|---|---|---|---|---|
| | 0 | 100 | 300 | 500 | 700 |
| 100 | 2.5 | 7 | 21 | 33 | 37 |
| 75 | 3.0 | 4 | 12 | 19 | 24 |
| 50 | <0.2 | 1 | 3 | 5 | 6 |

TABLE IV-continued

| | Transition Velocity of Admixtures (cm/s) | | | | |
|---|---|---|---|---|---|
| | Applied Field (Oersteds) | | | | |
| Wt.% Magnetics | 0 | 100 | 300 | 500 | 700 |
| 0 | <0.2 | — | — | — | — |

TABLE V

| | Bed Expansion of Admixtures at Transition (% of Initial Height) | | | | |
|---|---|---|---|---|---|
| | Applied Field (Oersteds) | | | | |
| Wt.% Magnetics | 0 | 100 | 300 | 500 | 700 |
| 100 | 2 | 27 | 58 | 68 | 70 |
| 75 | 3 | 18 | 37 | 43 | 45 |
| 50 | <1 | 10 | 18 | 22 | 23 |
| 0 | 22 | — | — | — | — |

Admixtures containing 25% by weight of magnetics did not remain homogeneously mixed during fluidization. Such a phenomenon, resembling limited miscibility in liquid-liquid mixtures, must be determined on an individual basis for any particular admixture of bed particles.

The utility of the magnetically stabilized compositions in applications such as ab or adsorptive separation of vapor species, catalyst utilization and regeneration, particulate filtration and subsequent bed cleaning, reaction of solids in moving beds and allied applications in which bed solids must be transported to and from the bed depend on the fluidized solids behaving as a medium capable of flowing in response to a pressure differential. The following example illustrates that the solids in the instant invention are imbued with fluid-like properties to a degree that is extremely well suited for such transport.

EXAMPLE 5

A tall, cylindrical, fluidization vessel of transparent plastic having inner diameter, $d_b$, of 7.37 centimeters and wall thickness of 0.44 centimeters was provided with a circular orifice having diameter, $d_o$, of 0.83 centimeters. The orifice center was located 7.5 centimeters above the top of the bed's porous support grid. Quantities of −40/+60 mesh G87RS magnetizable solids were admitted to the bed for tests in which the initial bed depth L varied from 8.0 to 14.2 centimeters above the center of the orifice. The superficial air speed in all tests was constant at 15.6 cm/s. Surrounding the bed was the source of uniform, axially oriented magnetic field provided within the bore of the two six inch I.D. electromagnets. The applied field in these tests was of equal intensity on both sides of the orifice. When the orifice was suddenly opened by removing a plug, it was observed that the bed contents issued as a well defined jet.

In a separate test with no fluidizing air flow, and with no applied field it was established that the powders jammed the orifice at once, and would not pass through of their own accord.

Table VI provides experimental results obtained for the discharge of the stabilized fluidized solids through the orifice. The time for the solids to discharge to a level $L_o$ of 4.0 centimeters above the orifice center was determined using a stopwatch, and a discharge coefficient C computed as $$C = \frac{\sqrt{L} - \sqrt{L_o}}{\sqrt{2g}} \cdot \frac{1}{T} \cdot \left(\frac{d_b}{d_o}\right)^2$$

where T is the time interval and g = 980 cm/s², the acceleration due to gravity. It may be seen from the table that the orifice coefficient was constant at 0.14 to 0.15 independent of initial bed depth or applied magnetic field intensity over the range studied.

TABLE VI

| Discharge Coefficient for Flow Through an Orifice Opening from a Bed of Magnetically Stabilized Fluid Solids | | |
|---|---|---|
| | Discharge Coefficient, C, Dimensionless Applied Field Intensity | |
| Discharge Time, s | 80 Oersteds | 400 Oersteds |
| 9.5 | — | .15 |
| 10.4 | .14 | — |
| 12.6 | — | .15 |
| 16.0 | .15 | — |
| 16.4 | — | .14 |
| 19.0 | .15 | — |
| 20.6 | — | .14 |

The above example and Table show that the stabilized fluidized solids flow in the manner of a liquid and hence are facilitated for transport between and within processing vessels. No prior art worker has reported any measurement or experiment demonstrating this behavior. Prior to the present invention this behavior for the magnetically stabilized solids was unknown.

COMPARATIVE EXAMPLES

EXAMPLE 6

U.S. Pat. No. 3,440,731 of Tuthill provides an example teaching the use of an alternating magnetic field to stabilize a fluid bed. The Tuthill example in common with the instant invention utilized an axial orientation of field colinear with the flow direction. However, the instant invention is distinguishable from the Tuthill example in specifying a nontime varying uniform magnetic field in order to obtain the widest range of bed stabilization over a specified range of gas fluidization flow rates as a function of applied magnetic field.

Thus Tuthill repeatedly teaches that the magnetic field exerts a force on the magnetizable particles. As already mentioned it is well known that a uniform magnetic field exerts no force on a magnetizable particle within said field. In no manner does Tuthill teach, show or suggest that a uniform field which exerts no force can usefully change fluidization. It is the new and entirely surprising discovery of this invention that a new and useful fluidized composition of matter may be achieved by use of a uniform magnetic field which exerts no force. In direct contradiction to Tuthill it is a necessary condition that the magnetic field be sufficiently uniform to exert little or no force in order to achieve said new fluidized composition of matter. Failure to use a uniform magnetic field will have the result that the field exerts a force on the fluidized matter, causing it to be nonuniform with undesirable effects.

To demonstrate the improved performance attendant to an increased uniformity of field, the Tuthill apparatus was duplicated and comparative tests performed as described in the following example.

An electromagnetic coil having an inner diameter of 2 in. and a square cross section of 1¼ in. was fabricated of 14 gage copper wire. When supplied with 60 cycle current of 1.25 amperes, 3.9 volts were measured across the magnet's terminals. The magnet resistance was 0.76 ohms and thus the $I^2R$ power dissipated by the magnet was 1.2 watts. A Hall probe positioned 9/16 inch above the top of the coil measured a field intensity of 34 gauss. At the same position Tuthill reports a field intensity of 365 gauss, or about ten times the value found here. It is well known that the field generated by a coil of a given conductor having a given geometry depends only on the power input. If it is taken as a fact from Tuthill's example, that his magnet also dissipated 1.2 watts, corresponding to 0.8 amperes of current and resistance of 1.9 ohm, his field should be smaller. It appears that the field intensity reported by Tuthill would require 10 times the current or 100 times the power he reported. Most likely the Tuthill field intensity is overstated.

Notwithstanding the above variance, a duplicate of the Tuthill bed was prepared comprising one hundred and ninety-two grams of ⅛ in. diameter carbon steel balls charged to an open-topped cylindrical glass fluidization chamber having an inner diameter of 1⅛ in. and a height of 24 inches. At the lower end of the column the diameter was tapered and fitted with a gas inlet of reduced diameter. Near the bottom of the column and supported by the tapered section were several layers of woven stainless steel mesh having about ⅛ in. openings. The mesh layers were arranged with their grid axes in non-orthogonal alignment to serve as a combination support grid for the balls and as a distribution plate for the fluidizing medium. As such this apparatus duplicated the apparatus of Tuthill.

The height of the settled bed of balls extended for 2⅛ inches above the topmost layer of mesh.

The results of a series of tests that indicate the influence of field uniformity on bed stabilization is summarized by Table VIII.

In the absence of an applied field the bed fluidized at a superficial velocity of 8.7 ft/s as evidenced by motion of balls at the bed surface. At 9.2 ft/s the bed contents exhibited circulatory motion, rising at the center and descending at the walls. At 10.5 ft/s the bed slugged to a height of 10 mm. With further increases of flow rate the bed contents could be made to slug to any desired height within the column. The value of 10.5 ft/s was adopted as a reference velocity, with the last column of Table VII representing incremental increases in superficial velocity associated with the application of the magnetic field.

With the magnet positioned above the bed the field nonuniformity was 165% as detailed in Tables VII and VIII. A comparative test at the nonuniformity of 51% corresponded to positioning the magnet at the level of the center point of the bed. An additional test at nonuniformity of 11% utilized another magnet, one having a six inch bore and four inch length.

In all cases, the application of magnetic field caused a deferral of slugging to a higher value of gas throughput.

In the tests described the bed contents were observed to recirculate prior to the onset of bed slugging. Generally this recirculation is undesirable in applications of stabilized beds requiring a high degree of staging or excellence of countercurrent contacting. It was suspected that the cause of recirculation was the low pressure drop of the support grid relative to the pressure drop f the bed. A grid of 100 mesh screen described in the example below was substituted for the ⅛ inch mesh of the Tuthill bed and cured the problem.

TABLE VII

INFLUENCE OF A.C. FIELD SPATIAL UNIFORMITY ON SLUGGING OF BED OF ⅛ IN. CARBON STEEL SPHERES

| Test Reference | Mean Field,[b] Gauss | Nonuniformity of Field, %[c] | Superficial Velocity, ft/s | |
|---|---|---|---|---|
| | | | Slugging[a] Motion | Velocity Increment |
| 4391-14 | 0 | — | 10.5 | 0 |
| 4391-15 | 35 | 165 | 12.0 | 1.5 |
| 4391-19 | 36 | 51 | 13.4 | 2.9 |
| 3459-51 | 35 | 11 | 14.4 | 3.9 |

[a] 10 mm height.
[b] Mean Field = (Maximum field in bed + Minimum field in bed)/2.
[c] Nonuniformity of field = (Maximum field in bed − Minimum Field in bed) × 100/Mean Field.
(d) Corresponds to nonuniformity in example of Tuthill.

TABLE VIII

MAGNETIC FIELD PARAMETERS

| Test Reference | Magnet Identification | Distance of Magnet Center over Grid, Inches | Magnet Current, Amperes | Magnetic Field, Oersteds | | | Nonuniformity, % |
|---|---|---|---|---|---|---|---|
| | | | | Maximum in Bed | Minimum in Bed | Mean in Bed | |
| 4391-14 | — | — | 0 | 0[a] | 0[a] | 0[a] | 0 |
| 4391-15 | 2 inch bore | 4½ | 3 | 63[b] | 6[d] | 35 | 165 |
| 4391-19 | 2 inch bore | 1¼ | 1 | 45[c] | 27[b],[d] | 36 | 51 |
| 3459-51 | 6 inch bore | 1¼ | .58 | 37[c] | 33[b],[d] | 35 | 11 |

[a] Ignores laboratory background field of about 0.5 gauss.
[b] Bed top surface.
[c] Bed center.
[d] Bed bottom.

The electromagnetic coil was supported coaxially with the fluidization column with the mid-plane of the coil at a height of 4½ in. above the top-most layer of mesh.

A rotameter fed by a regulated source of compressed air was provided to measure the flow rate.

Since Tuthill employed a magnetic source driven by an alternating current, the direction of field reversed with time. If the bed of particles possess an appreciable remanence the reversal of field direction can cause the particles to rotate or agitate in attempting to track the field direction. The following example demonstrates the adverse influence alternating magnetic field can exert on stability of such fluidized solids.

Example 7

The fluidization chamber of the example given previously was modified by removing the coarse grid and adding a grid of 100 mesh screen capable of supporting powders that are screened to −40/+60 mesh. A packing of ¼ inch plastic spheres was provided upstream of the mesh to insure a uniform approach flow. The first quadrant hysteresis loop for G87RS powder was determined using a vibrating sample magnetometer. The saturation moment was 13.8 e.m.u./g. at 3500 gauss and remanence was about 3 e.m.u./g. A 39 mm depth of the G87RS powder was placed on the grid and a series of tests performed using direct and then alternating current to energize the 1¼" × 1¼" cross-section magnet described in the previous example. The results of these tests are summarized in Table IX. Here the term "transition speed" is used with a special meaning in reference to the AC tests wherein although the term denotes the observation of surface bubbling the bed is not truly fludized (lifted).

TABLE IX
INFLUENCE OF ALTERNATING AND DIRECT CURRENT FIELD SOURCES ON SURFACE BUBBLING OF A MAGNETIC POWDER HAVING REMANENCE[(a)]

| Peak Field,[(b)] Gauss | Transition Velocity, cm/s | |
|---|---|---|
| | DC | AC |
| 0 | 13.0 | 13.0 |
| 30 | 15.5 | 7.1 |
| 60 | 17.8 | 7.8 |
| 90 | 20.5 | 9.3 |
| 120 | 22.4 | 10.0 |

[(a)]39 mm depth of −40/+60 mesh G87RS.
[(b)]DC and AC sources both 20% non-uniform over the bed volume.

From Table IX it may be seen that application of the direct current field increased the transition velocity of the bed of powders while application of the alternating current field decreased the transition speed relative to the value observed in the absence of field. Thus, alternating field is undesirable in preparing the said stabilized compositions of matter.

The instant invention is distinguishable from the Tuthill art in that time steady magnetic fields are preferred in the instant invention.

Ideally in a fluidized bed an individual particle of the bed may rotate with a minimum of frictional torque due to the negligible contact with neighboring particles. By considering the angular displacement of a bed particle having remanent moment in response to the magnetic torque set up by a reversing field, with rotation resisted by particle inertia alone, a criterion may be obtained indicating the range over which alternating field produces an appreciable rotation of the particle and hence presumably tends to upset the stability of the bed. The criterion may be stated as $$N_c \begin{array}{l} >1 \text{ unstable} \\ <1 \text{ stable} \end{array}$$

where $$N_c = \frac{5 \alpha_r H}{8 \pi R^2 f^2}$$

The criterion applies for field cycle times that are smaller than the duration of bed operation. Thus, direct current beds, which have the greater stability, are not described by the criterion. In the formula $\sigma_r$ is remanent moment (e.m.u./g.), H is applied field (oersteds), R is equivalent spherical radius of the particle (cm) and f is frequency (Hz). Table X comparing conditions of Examples 6 and 7 illustrates that the criterion predicts correctly the outcome of these tests. Thus, the criterion is suggested to detireate the combinations of particle magnetic moment and size, and magnetic field intensity and frequency which permit bed stabilization to be obtained in the face of alternating field. Stability in the race of alternating applied field is favored by large particle size, high frequency, and small remanence. As can be seen from the above Example, the use of alternating applied magnetic fields can be deleterious to the stability of fluidized magnetized solid particulates.

TABLE X
STABILITY OF FLUIDIZED SOLIDS TO ALTERNATING MAGNETIC FIELD

| | Example 6 | Example 7 |
|---|---|---|
| Bed Media | Iron spheres | Catalyst powder |
| Particle size, R, cm. | 0.16 | .021 |
| Remanent moment, $\sigma_r$, c.m.u./g. | 1.5 | 3.0 |
| Field intensity, H, oersted | 35 | 30 |
| Frequency, f. Hz | 60 | 60 |
| $N_c$ (computed) | 0.13 | 11 |
| Prediction | Stable | Unstable |
| Observation | Stable | Unstable |

Example 3 has already illustrated the very adverse influence that an appreciable transverse gradient of field may exert on the ability of a bed of magnetizable particles to be fluidized. In the following example, it is demonstrated that when the applied field is vertically oriented it is preferable in the interest of achieving the widest possible stable range of the bed at the lowest consumption of electrical power to utilize the most uniform possible magnetic field.

Example 8

Various configurations of magnets, magnet position relative to the vessel and magnet current were set up to provide discrete levels of field nonuniformity at several constant values of mean field applied over the volume of a bed of −40/+60 mesh G87RS solids having a settled bed depth of 39 mm. The magnets were those described in the previous examples. The bed was the 1½ inch inner diameter glass column.

The operating conditions and test results are given in Table XI where it may be seen that mean field was set as 0, 40 ca 120, or 400 oersteds in any given test and, likewise, the variation of field over the volume of the bed in any one test was established as 136%, 17% or 4%. Transistion speed was established by noting for a bed whose content had previously been aerated in the absence of applied field, the flow rate at which steady bubbling was observed at the top surface after magnetic field had again been applied. The last column of Table XI lists the width of the stable range, measured in velocity units, between the normal fluidization speed of the bed and the speed at which bubble transition occurs. At the low mean field of 40 oersteds where the stable range is very narrow, about 4 velocity units (cm/s), the precision of the data does not permit any conclusion regarding the influence of field nonuniformity on transition. However, at the mean field of about 120 oersteds it is seen that the field with 4% variation stabilizes twice as broad as nonbubbling range as the nonuniform 17% and 136% cases. The same striking behavior is exhibited in the tests at 400 oersteds mean field in which stability over a range of width 29.1 cm/s was achieved at 4% spatial variation in applied field while 17% variation reduced the stable range to only 17.8 cm/s.

In addition to the superior performance attendant to use of uniform field it is noted that power consumption to operate an electromagnet source of field is vastly reduced. For example, referring to Table XI, for mean field of 120 oersteds, the equivalent stable range is obtained at 136% nonuniformity as at 17%, but the power consumption assuming the magnet's resistance was unchanged, was larger by the square of the ratio of current. This computes to $(25/3)^2$ or 69.4 times the power consumption at 136% as at 17% nonuniformity of field.

ment with no relative motion between bed solids when the bed discharges.

Twelve hundred and eighty five grams of 350 to 840 microns G87RS catalyst was placed in a 7.5 centimeter transparent plastic vessel fitted with a porous disk distributor. The dumped bed height was about 28.4 centimeters. Eight discharge ports were provided symmetically spaced around the vessel sidewall, each having diameter 0.64 centimeter with the center of each hole 3.8 centimeter above the top of the distributor. A rotary valve permitted opening the discharge ports simultaneously.

A portion of the normally black bed solids was tagged with a surface coating of blue pigment particles, Ultramarine 59-4933 of Cyanamid Company, and

TABLE XI

INFLUENCE OF AXIAL D.C. FIELD AXIAL UNIFORMITY ON TRANSITION TO BUBBLING FOR BED OF −40/+60 MESH G87RS[b]

| Test No.[c] | Magnet Configuration[a] | Current, Amperes | Mean Field,[c] Oersteds | Nonuniformity[c] of Field, % | Superficial Transition | Velocity,cm/s Stable Range |
|---|---|---|---|---|---|---|
| 47:20 | None | 0.0 | 0 | 0 | 13.2 | 0.0 |
| 50:A | T/A | 9.0 | 40 | 136 | 17.8 | 4.6 |
| 47:24 | T/C | 1.0 | 40 | 17 | 16.6 | 3.4 |
| 49:B | R/C | 0.5 | 40 | 4 | 17.3 | 4.1 |
| 50:C | T/A | 25.0 | 111 | 136 | 21.3 | 8.1 |
| 47:25 | T/C | 3.0 | 120 | 17 | 21.9 | 8.7 |
| 49:D | R/C | 1.5 | 120 | 4 | 30.8 | 17.6 |
| 50:E | T/C | 10.0 | 400 | 17 | 31.0 | 17.8 |
| 47:10 | R/C | 5.0 | 400 | 4 | 42.3 | 29.1 |

[a]T denotes 2 inch bore 1¼" × 1¼" cross-section toroidal electromgnet. R denotes two 6 inch bore electromagnets at 1¼ inch separation. A denotes magnet center 4¼ inches above support grid. C denotes magnet center coincident with center of bed.
[b]Settled bed depth of 39 mm over 100 mesh grid.
[c]Definitions are given in footnotes to Table VIII.

Throughout the foregoing the discussion has utilized the artifice of a fluidization chamber operated in the presence of a gravitational force field. It will be evident that the new composition of matter can be generated as well in other force fields provided the flow of fluidizing gas is in the direction opposing the external force field. Thus the force field may be due to centrifugal forces of a rotating system, or for the electrical force on charged matter in an electrostatic field, or to dielectrophoretic force of electrically polarized matter in an electrostatic field having a field gradient, or to forces caused by presence of a magnetic field gradient, or to Lorentz force due to passage of a current at an angle to a magnetic field, or due to any other force field or to combinations of the foregoing. In each instance the end result is the achieving of a stable form of fluidized matter having the thermodynamic analog properties, transport properties and other properties inherent to the state of bulk matter already described.

It is noted that while the instant invention has been defined in terms of a novel composition of matter, the process for obtaining said composition, as claimed below, is also a part of the instant invention. Also the composition of matter disclosed above may be arranged throughout the contents of a bed or alternatively, if desired, at points or regions within a bed. It will be understood that the term point denotes a localized region which in all dimensions is large compared to the spacing between particles and is small compared to any dimensions of the bed.

Example 9

Example 5 demonstrated that the solids in the magnetically stabilized fluidized bed will flow and discharge through an orifice in the vessel sidewall. The purpose of this example is to demonstrate further that movement of the solids may achieve piston displaceplaced in the bed in layers. In the settled bed the blue colored layers varied from 0.80 to 1.0 centimeter in thickness with the bottom of the lowest layer located 9.7 centimeters above the distributor and the remaining layers spaced 5.0 centimeters apart from each other with the uppermost layer forming the top of the bed.

The field source was a 20 centimeter bore by 100 centimeter long electromagnet solenoid made up of 12 identical pancake modules each having thickness of 4.1 centimeters and face to face separation of 7.0 centimeters over the region occupied by the vessel. The applied field was uniform to within 2% over the test volume, and in the test applied field intensity was constant at 400 oersteds.

With the field applied and the discharge ports closed, a flow of air was admitted to the vessel. As minimum fluidization speed was passed the bed expanded with further increase of flow rate and the colored bands were observed to rise with the bed. The flow rate was brought to a superficial velocity of 30.5 cm/s. The interfaces between the colored layers and the bed remained sharply defined.

The rotary valve was actuated to suddenly open the eight discharge ports. The bed volume then suddenly contracted due to reduction of air flow up the bed as a portion of the flow bypassed through the discharge ports. Then a slower process of bed movement continued in which the solids descended and the colored layers were observed to move down the column as bed solids discharged through the vessel sidewall openings. With the bed solids about half discharged the rotary valve was rapidly closed, the full upward flow of air resumed, and the bed observed to expand and accommodate the increased air throughout that once again was established.

With the bed then quiescent in stable batch operation, the colored layers could be examined at leisure. Inspection of the layers illustrated they were free of distortion and that the bed was free of solids backmixing insofar as could be detected from the appearance at the bed side surface and the bed top. There was no adherence of solids to the wall and it was concluded the solids descended with uniform speed over the bed cross section. Sufficiently close to the discharge ports the flow, of course, cannot remain one dimensional in character but must flow sideways.

Inspection of the solids discharged from the ports revealed the amounts to be closely equal and distributed in piles at nearly equal distances from the discharge ports.

The rotary valve again was opened and the solids permitted to discharge fully. Motion picture photographs were recorded of the test and verified the above description.

Example 10

The purpose of this example is to illustrate by measurement the absence of fluctuations of bed voidage in the stably fluidized magnetized bed of the present invention and the presence of fluctuations when the bed bubbles.

One hundred and sixty six grams of $-20/+30$ U.S. sieve G-87RS catalyst were placed in a 5 centimeter I.D. glass vessel fitted with a porous disk distributor. A magnetic field of 569 oersted intensity was applied to the bed. Nitrogen at ambient temperature and pressure was passed upward at a superficial velocity of 51.4 cm/s yielding an expanded bed height of about 15 centimeters. Minimum fluidization velocity previously was found to be 23.5 cm/s as determined from the breakpoint in a curve of measured values of pressure vs. flow rate.

A Hall effect gaussmeter probe (Bell Z OB4-3218) was mounted above the vessel with its active element in the middle of the bed of solids. The probe is a flat ended cylinder of 0.81 cm O.D. sensing the magnetic field component normal to the flat end, i.e. the axial component of field in the vessel. The probe was connected to a Bell 620 gaussmeter, whose output was amplified by a Tektronix AF 501. A custom low-pass filter having amplitude response down 50% at 70 Hz to eliminate a 5 KHz gaussmeter oscillator signal then fed a Disa 55 D 35 RMS unit operated with a 100 second averaging time, whose output was recorded on a Hewlett-Packard 7004B X-Y recorder.

Table XII presents the sequence of mean axial magnetic field intensities applied to the bed, the fluctuation of the field expressed as a percentage of the mean and the visually observed state of the bed. Fluctuations were absent within the precision of the measurement at mean field intensities of 350 oersted and greater, corresponding to a visually observed quiescent state of the bed. The fluctuation level rises very sharply as the field is decreased through the bubble point, and more gradually thereafter. The zero measured values of H rms/H means in column 2 of Table XII indicate the complete absence of bubbles in the fluidized medium.

TABLE XII

MAGNETIC FIELD FLUCTUATION MEASUREMENTS IN FLUIDIZED MAGNETIZED MEDIUM

Hall Probe Measurements

| H mean oe. | H rms[(1)]/H mean % | | State of Bed |
|---|---|---|---|
| 569 | 0 | | quiescent |
| 461 | 0 | | quiescent |
| 442 | 0 | (2) | quiescent |
| 400 | 0 | | quiescent |
| 360 | 0 | | quiescent |
| 350 | 0 | | quiescent |
| 309 | 0.6 | | light bubbling |
| 242 | 1.0 | | moderate bubbling |
| 119 | 1.8 | | heavy bubbling |
| 60 | 2.2 | | heavy bubbling |
| 12 | 5.0 | | heavy bubbling |

[(1)]rms is defined as the root mean square of the fluctuation signal.
[(2)]Values listed as zero in fact were somewhat less than the noise level after correcting for measured noise, hence are neglected. The neglected values ranged from 0.004 to 0.013 percent.

Example 11

This example demonstrates the influence of particle size and bed mass on transition velocity.

The bed solids were various narrowly sieved sizes of Monel (ferromagnetically soft copper-nickel alloy) having specific gravity 8.45 and particle magnetization of 372 gauss at 5000 oersteds applied field. The transparent plastic cylindrical fluidization vessel was 7.57 centimeter inside diameter and fitted with a porous disk distributor. The fluidizing gas was air. The field source was the 20 centimeter bore elecctromagnet described in Example 9. This electromagnet was water cooled through its hollow copper conductive windings.

Results of tests in which length of the bed and superficial velocity of the air were determined at the transition point are tabulated in Table XIII for various amounts of solids in the vessel. At every test condition the bed was observed to fluidize smoothly, the bed top surface was flat and finely structured, and transition to bubbling occurred suddenly with a reproducibility of 5% or less of the superficial velocity.

It may be seen that transition velocity increases with increase of particle size and decreases with increase of bed length. The transition speed of long bed tends to be invariant of bed length.

The response and expansion of a bed having a constant mass of Monel solids is given at Table XIV. As superficial velocity increases from its initial zero value the bed remains unchanged in length save for a minor restructuring of the bed top surface. At the point of minimum fluidization the bed begins to expand. Expansion is continuous as flow rate increases with the medium remaining quiescent in the stably fluidized state until the point of transition to bubbling occurs. The break in the curve of bed length versus flow rate furnishes a definitive means of determining minimum fluidization speed as an alternative to determining the break in the curve of pressure drop versus flow rate.

TABLE XIII

CORRESPONDING VALUES OF TRANSITION LENGTH AND VELOCITY IN VARIABLE MASS BEDS OF MONEL

H = 5080 Oersteds
Particle Size, Microns

| Nominal Mass[(1)], Grams | 149–177 | | 177–250 | | 250–297 | |
|---|---|---|---|---|---|---|
| | $L_T$, cm | $U_T$, cm/s | $L_T$, cm | $U_T$, cm/s | $L_T$, cm | $U_T$, cm/s |
| 150 | 2.2 | 93 | 2.6 | 130 | 2.2 | 124 |

TABLE XIII-continued
CORRESPONDING VALUES OF TRANSITION LENGTH AND VELOCITY IN VARIABLE MASS BEDS OF MONEL H = 5080 Oersteds

| Nominal Mass[1], Grams | Particle Size, Microns | | | | | |
|---|---|---|---|---|---|---|
| | 149–177 | | 177–250 | | 250–297 | |
| | $L_T$, cm | $U_T$, cm/s | $L_T$, cm | $U_T$, cm/s | $L_T$, cm | $U_T$, cm/s |
| 400 | — | — | 5.6 | 90 | 5.0 | 115 |
| 700 | 7.1 | 51 | 7.5 | 70 | 7.9 | 94 |
| 1250 | 13.5 | 50 | 13.6 | 62 | 13.7 | 85 |
| 1900 | 19.2 | 50 | 19.9 | 64 | 20.0 | 85 |

[1]Minimum bubbling speeds in absence of field increase with bed mass over the range given below:

| $D_p$, Microns | Velocity, cm/s |
|---|---|
| 149–177 | 19–22 |
| 177–250 | 25–29 |
| 250–297 | 33–42 |

Table XIV
RESPONSE AND EXPANSION OF CONSTANT MASS MONEL SOLIDS TO INCREASING AIR FLOW RATE

| Superficial Velocity, U, cm/s | Bed Length L, cm | Comments |
|---|---|---|
| 0 | 20.7 | Unfluidized |
| 12 | 20.7 | Unfluidized |
| 18 | 20.8 | Unfluidized |
| 22 | 20.8 | Unfluidized |
| 28 | 20.8 | Min. Fluidization |
| 34 | 21.5 | Stably Fluidized |
| 40 | 22.3 | Stably Fluidized |
| 51 | 24.4 | Stably Fluidized |
| 57 | 25.5 | Stably Fluidized |
| 61 | 26.0 | Stably Fluidized |
| 66 | 26.3 | Transition Point |

Mass of Monel 2840 grams.
Particle size 177–250 micron.
Applied field 5000 oersteds
Vessel I.D. 7.57 centimeters.

Example 12

This example demonstrates that minimum fluidization velocity of a magnetizable particle bed is constant and unaffected by the presence of intensity of an applied magnetic field and that a higher velocity of gas throughput is required to cause the stably fluidized bed to undergo transition from the quiescent state to a state of bubbling or slugging motion.

A cylindrical fluidization vessel of 7.49 centimeter inside diameter and 41 centimeter height over a microporous support grid is loaded with 3110 grams of C1018 iron spheres supplied by Nuclear Metals Corporation. The iron spheres are screened to the size range of 177 to 250 microns. The bed length with initially loaded solids is 15 centimeters. The magnetic field source is the pair of 6 inch bore electromagnets, each having length of 4 inches and face to face separation of 1.5 inches. The magnetic field is oriented colinear with the bed flow axis, with the center of the magnet pair at the center of gravity of the bed contents. The fluidizing gas is air.

A long straight glass tube of 6 mm O.D. and 4 mm I.D. is inserted vertically into the bed to sense bed pressure in the bed. The tube tip is positioned one centimeter above the bed grid and a U-tube manometer connected to the other end of the tube. The bed is fluidized in the bubbling regime in the absence of field, then collapsed by stopping the gas flow before the beginning of a test sequence. The magnetic field is applied in the absence of flow, and pressure measured in response to increases in flow rate at the constant magnetic field setting.

Magnetometer measurement of the iron solids using the vibrating sample technique gives the values of magnetic moment listed in Table XV.

TABLE XV
MAGNETIC MOMENT OF 177–250 MICRON C1018 STEEL SPHERES[1],[2] IN APPLIED FIELDS

| Applied Magnetic Field, H, Oersted | Magnetic Moment $\sigma$, emu/g | Magnetization M, gauss [3] |
|---|---|---|
| 0 | 0.026 | 2.6 |
| 16 | 0.68 | 67 |
| 32 | 1.28 | 127 |
| 48 | 1.86 | 184 |
| 64 | 2.45 | 242 |
| 80 | 3.03 | 300 |
| 0[4] | 0.030 | 3.0 |

[1]Sample mass of 0.3329 grams in cylindrical sample holder of about 3 mm I.D.
[2]Saturation moment in 16,000 oersteds applied field of 212 emu/g or 20,970 gauss.
[3]$M = 4\pi\rho\sigma$ with density $\rho$ taken as 7.87 gram/cm$^3$.
[4]Reduced from 80 oersteds.

The remanent magnetization of 2.6 to 3.0 gauss is small compared to the magnetization values at the applied field intensities, hence the material may be regarded as ferromagnetically soft in this working range.

Figure 5:
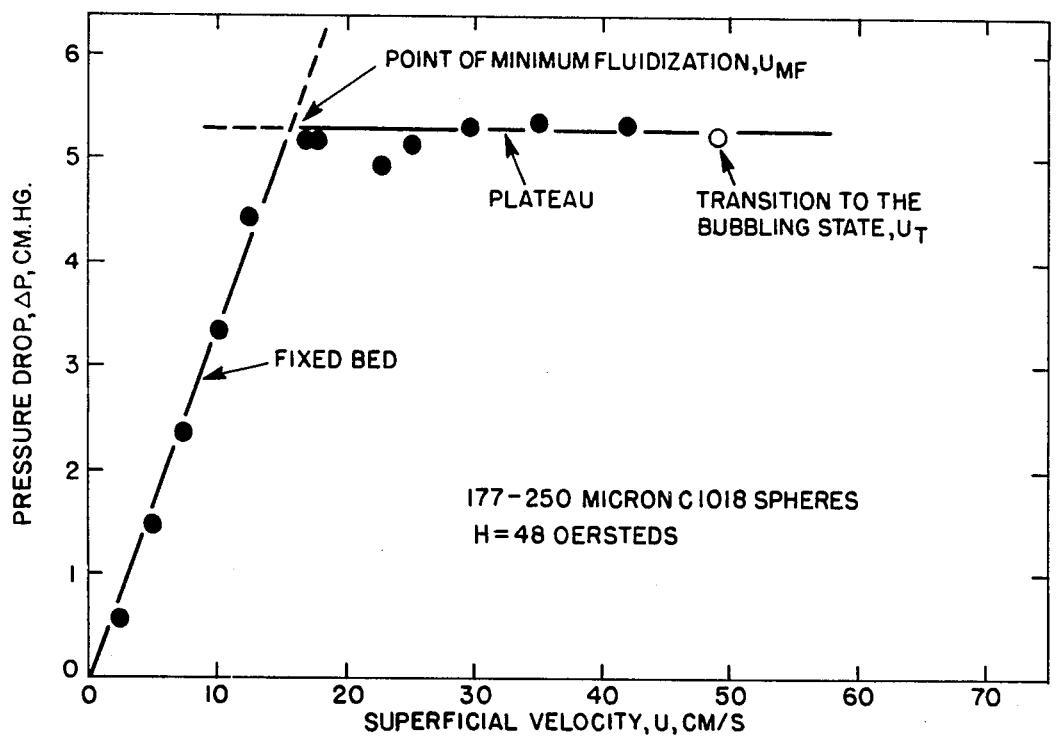
FIG. 5 graphically represents the pressure drop of 177–250 micron steel (C1018) spheres as a function of superficial gas velocity at a uniform applied magnetic field of 48 oersteds.

Table XVI lists values of pressure drop across the whole bed length versus superficial flow rate at various intensities of applied magnetic field. FIG. 5 presents the data plot for the field intensity of 48 oersteds. The breakpoint of the curve is taken as the point of minimum fluidization. Values of minimum fluidization velocity $U_{MF}$ obtained in this manner are tabulated in the second column of Table XVII. There it may be seen that minimum fluidization speed has a sensibly constant value independent of applied field intensity.

From column three of Table XVII it is seen that bed length is constant and unchanging below the point of minimum fluidization. The bed expands at flow rates greater than minimum fluidization velocity, reaching the length given in the fifth column of Table XVII at the point of transition to the bubbling state. The transition to bubbling or slugging occurs suddenly as determined by visual observation. Steady surface bubbling for a minimum duration of about 30 seconds is taken as criterion for the transition, with the velocity at transition denoted $U_T$. Values of $U_T$ are tabulated in the fourth column of Table XVII. At H of 64 and 72 oersteds, transition was to slugging.

Figure 6:
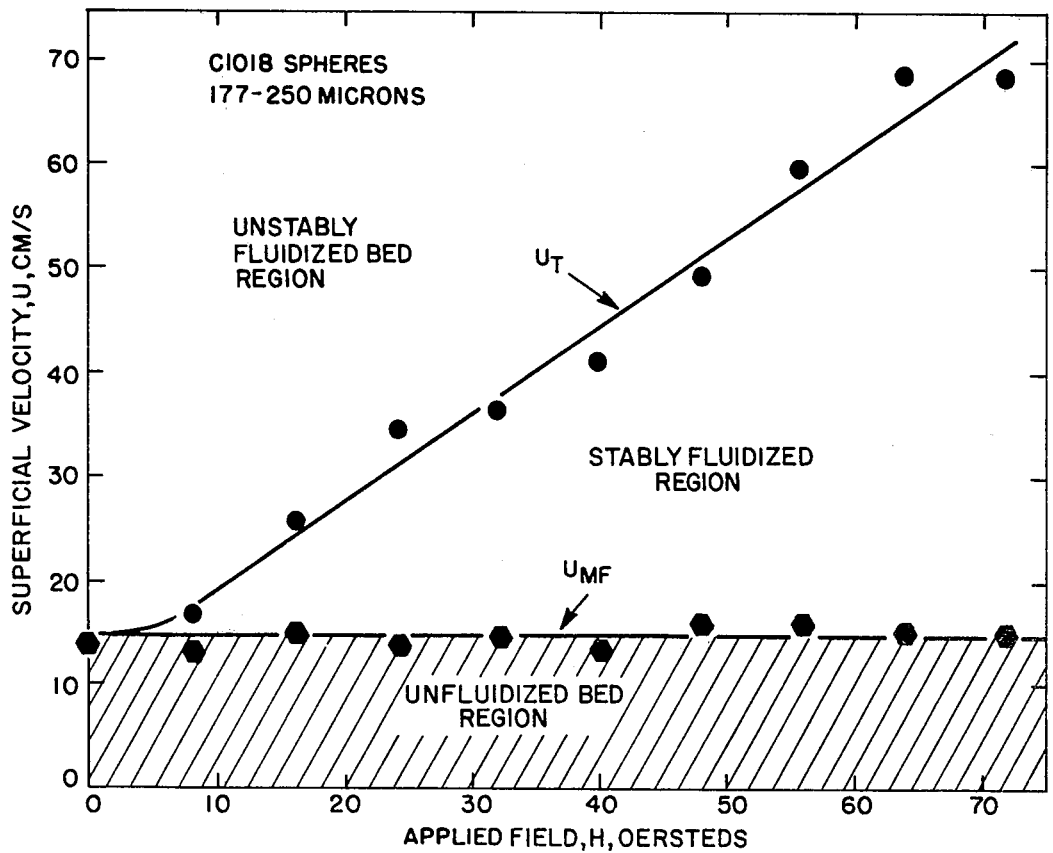
FIG. 6 graphically represents a three phase diagram resulting from the plotting of the minimum fluidization velocity and the transition fluidization velocity as a function of an applied uniform magnetic field. The experimental system is the same as used in FIG. 5.

FIG. 6 presents the diagram that results from plotting $U_{MF}$ and $U_T$ versus applied field. The magnetically stabilized state of fluidized solids is defined by the region between the curves of $U_{MF}$ and and $U_T$. This region provides a broad operating range in which the medium is fluidized yet quiescent and free of bubbles or solids backmixing. The bed medium in this region is facilitated for transport, e.g. into or out of the containing vessel.

process and the properties of the medium thereby generated are totally unexpected and surprising.

TABLE XVII

BEHAVIOR SUMMARIZED FOR THE MAGNETIZED BED OF STEEL SPHERES (177–250 MICRONS)

| Applied Field H, Oersteds | Minimum Fluidization Velocity, $U_{MF}$, cm/s | Bed Length At $U_{mp}$ Lm, cm | Transition Velocity, $U_T$, cm/s | Bed Length At Transition, $L_T$, cm | $\Delta P$ W/A |
|---|---|---|---|---|---|
| 0 | 13.5 | 15.0 | 13.5 | 15.0 | 0.91 |
| 16 | 14.8 | 15.0 | 25.8 | 15.5 | 0.89 |
| 32 | 14.6 | 15.0 | 36.1 | 15.8 | 0.94 |
| 48 | 15.6 | 15.0 | 49.2 | 16.8 | 1.00 |
| 64 | 15.0 | 15.0 | 68.3 | 18.0 | 1.02 |
| 72 | 15.0 | 15.0 | 68.3 | — | 1.00 |

At applied field of 80 oersteds the bed medium entrains as a plug moving up the vessel column at a gas throughput less than transition.

TABLE XVI

INFLUENCE OF FLOW RATE AND APPLIED FIELD INTENSITY ON PRESSURE DROP FOR FLOW OF AIR THROUGH A BED OF IRON SPHERES[1], [2]

| Flow Rate, U cm/s | Applied Field Intensity, H, Oersteds | | | | | |
|---|---|---|---|---|---|---|
| | 0 | 16 | 32 | 48 | 64 | 72 |
| 1.88 | — | 0.54 | 0.65 | 0.57 | 0.60 | 0.61 |
| 4.25 | 1.5 | 1.4 | 1.5 | 1.5 | 1.4 | 1.5 |
| 6.75 | 2.4 | 2.1 | 2.4 | 2.4 | 2.2 | 2.2 |
| 9.50 | 3.4 | 3.1 | 3.3 | 3.3 | 3.3 | 3.3 |
| 12.3 | 4.5 | 3.9 | 3.9 | 4.4 | 4.3 | 4.3 |
| 16.7 | 4.6 | 4.5 | 4.2 | 5.1 | 5.4 | 5.4 |
| 17.9 | 4.6 | 4.6 | 4.3 | 5.1 | 5.7 | 5.6 |
| 22.5 | 4.7 | 4.7 | 4.3 | 4.9 | 5.8 | 5.1 |
| 25.3 | 4.6 | 4.6 | 4.8 | 5.1 | 4.6 | 5.3 |
| 29.5 | 4.6 | 4.6 | 4.8 | 5.3 | 4.9 | 5.4 |
| 35.1 | — | 4.6 | 4.8 | 5.3 | 5.4 | 5.5 |
| 42.2 | — | — | 4.9 | 5.3 | — | — |
| 49.2 | — | — | — | 5.2 | 5.4 | 5.5 |
| 70.0 | — | — | — | — | 5.2 | 4.8 |
| 98.0 | — | — | — | — | — | 5.5 |

[1] Pressure units are centimeters of mercury, extrapolated to support grid surface based on linear change with distance.
[2] C1018 steel 177–250 microns.

The final column of Table XVII tabulates the plateau value of pressure drop normalized by the ratio of bed mass W to bed cross section area A; this quantity theoretically equals unity when expressed in dimensionally consistent units. The experimental values are in reasonable agreement with the theoretical expectation and verify the existence of the fluidized state of the bed in both the stabilized and bubbling regimes, i.e. regions in which velocity U is less than and greater than $U_T$, respectively.

Sonoliker, R. L. et al., *Indian Journal of Technology*, 10, 377 (1972) reported observations of fluidized iron powders subjected to an axially oriented applied magnetic field. In particular in Table I of Sonoliker et al., experimental results are given for the minimum fluidization velocity of iron particles, including results for particles of 244 microns diameter, hence comparable to the size range studied here. The values of minimum fluidization velocity in Sonoliker et al increase exponentially with applied field intensity. This is in marked contrast to the sensibly constant value of minimum fluidization velocity characterizing the instant invention and illustrated by values in column two of Table XVII below. It is possible that Sonoliker at al observed transition velocity $U_T$ and identified it as minimum fluidization speed $U_{MF}$. Accordingly, Sonoliker et al might have passed through the stabilized region in a transitory manner in their experiments. In any event it is clear that Sonoliker et al provide no teaching of the existence of a stably fluidized region as instantly claimed. In view of the report of Sonoliker et al the performance in the instant

EXAMPLE 13

Ammonia catalyst of 3 to 6 mm. particle size was crushed and sieved to U.S. mesh −20/+30. This catalyst was previously magnetized in an applied field of 5000 oersteds. Due to its remanent magnetization the material had the texture of wet sand, noticeable when pouring or screening.

A quantity of 1280 grams was added to a fluidization vessel having inside diameter of 7.33 cm. The depth of solids over the fitted porous distributor was 17.8 cm.

In the absence of applied field as air flow was increased the bed of solids was observed to develop voidage layers of separation in the upper one-third of the bed at a superficial velocity of 10.3 cm/s. Pressure drop through the bed increased smoothly with increase of superficial velocity until at 38.3 cm/s a spout formed in the bed and the pressure drop decreased from about 6.4 cm. of dibutylphthalate (DBP) to 2.9 cm. The spout had formed along the length of the 6 mm O.D. by 4 mm I.D. glass tube used as the pressure probe that was inserted at a 9 cm. depth within the bed. Thus, these solids failed to fluidize properly in the absence of applied field.

When uniform, axially oriented magnetic field of 40 oersteds was applied the measured pressure drop increased smoothly with increase of air flow rate up to a superficial velocity of 42.7 cm/s. A further increase of superficial velocity to 46.6 cm/s then caused a spout to form adjacent to the probe and the measured pressure drop decreased by about 47%. Again the bed structure deteriorated and lead to bypassing of the gas stream.

Finally, with applied field of 80 oersteds and the probe tip located about 5 mm. above the support grid, the bed retained its structural integrity throughout a test sequence in which superficial velocity ranged up to 100.4 cm/s. Pressure drop initially increased linearly with superficial velocity, then plateaued at 25.6 cm. DBP. The break in the curve of pressure drop vs. superficial velocity defined a point of minimum fluidization of 40.0 cm/s. The bed length was constant at 17.8 cm. up to the point of minimum fluidization, then expanded to 24.0 cm. at the said maximum flow rate of 100.4 cm/s. The bed remained free of bubbles or agitation at all flow rates studied. The test was repeated and displayed the similar behavior with maximum superficial velocity reacing 115 cm/s.

Magnetic moment of this ammonia catalyst is given in Table XVIII. The amount of 0.03 emu/g at zero applied field pertains to a powder sample of the −20/+30 mesh material that had previously been subjected to 5000 oersteds applied field. The low moment indicates the sample particles were nearly randomly oriented since the remanent magnetization is large for an undisturbed sample, i.e., 18.4 emu/g after exposure to applied field intensity of 16,000 oersteds.

TABLE XVIII

| MAGNETIC MOMENT OF AMMONIA CATALYST | |
|---|---|
| Applied Field H., re. | Magnetic Moment emu/g |
| 0 | 0.03 |
| 40 | 1.58 |
| 80 | 3.26 |
| 5,000 | 144 |
| 16,000 | 166 |
| 0 | 18.4 |

EXAMPLE 14

This example illustrates that fluctuations of gas pressure distinguish the bubbling state of magnetized, fluidized solids from the stably fluidized state. In the stably fluidized state fluctuations are not detected.

Two thousand nine hundred and seventy grams of 177–250 micron spherical particles of C1018 steel described in Example 13 were placed in a fluidization vessel having inside diameter of 7.32 centimeters. The vessel was fitted with a pressure tap in the sidewall at a point 4 centimeters above the porous support grid. The pressure tap contained a wire mesh screen that prevented particles from leaving the vessel. One side of a U-tube manometer containing water was connected to the tap and the other end of the manometer kept open to the atmosphere as was the top of the fluidization vessel. Uniform, axially oriented magnetic field of 48 oersteds intensity was applied to the solids using the pair of six inch bore electromagnets. Increasing rates of steady air flow were admitted to the vessel to obtain measurement of pressure drop $\Delta P_o$ read as difference in height of water in the manometer legs. When the bed became stably fluidized, its length gradually expanded with increased gas flow. Observation was also made of pressure drop fluctuation $\pm\Delta P'$, if any, and presence or absence of visible bubbling or motion in the fluidized medium. The fluctuations in pressure drop represent values detected over about a ten second interval. The observed values of pressure drop, pressure drop fluctuations, bed length and other parameters, are listed in Table XIX.

From the data in Table XIX it may be seen that the stably fluidized state is clearly distinguishable from the settled state (fixed bed state) as well as from the unstably fluidized state. Thus, only in the stably fluidized state is pressure drop invariant of flow rate, and bed length increasing with an increase of flow rate, while pressure fluctuations are absent. Comparative behavior of the states is summarized in Table XX.

It is noted that in the fluidized states the constant value of average pressure drop indicates the solids in the vessel were supported entirely by fluid forces. Visual observation of initial bubbling and motion in the bed coincide with the first detectable fluctuation of pressure drop (pressure difference).

TABLE XIX

PRESSURE DROP, PRESSURE FLUCTUATIONS, AND BED LENGTH CHANGE OF AIR FLUIDIZED C1018 STEEL SPHERES OF 177–250 MICRON DIAMETER IN 48 OERSTED APPLIED FIELD

| U cm/s | $\Delta P$. cm H$_2$O | $\pm\Delta P'$ cm H$_2$O | $\Delta L$, cm | State of the solids | Bubbles or Motion |
|---|---|---|---|---|---|
| 5.6 | 19.1 | 0 | 0 | Settled | No |
| 8.5 | 34.8 | 0 | 0 | Settled | No |
| 12.7 | 54.0 | 0 | 0 | Settled | No |
| 15.2 | 51.6 | 0 | 0.5 | Stably Fluidized | No |
| 19.8 | 55.8 | 0 | 1.3 | Stably Fluidized | No |
| 25.4 | 56.5 | 0 | 2.0 | Stably Fluidized | No |
| 31.7 | 56.6 | 0.05 | 2.7 | Unstably Fluidized | Yes |
| 40.9 | 51.0 | 3.0 | 3.5 | Unstably Fluidized | Yes |
| 56.5 | 53.0 | 3.0 | 3.5 | Unstably Fluidized | Yes |

TABLE XX

DISTINGUISHABLE STATES OF THE PARTICULATE SOLIDS

| State of Solids | Pressure drop increase with flow | Bed Length increase with flow | Pressure Fluctuates |
|---|---|---|---|
| Settled | Yes | No | No |
| Stably Fluidized | No | Yes | No |
| Unstably Fluidized | No | Yes | Yes |

As can be seen from the above examples and description of the invention, the present invention provides a means for conducting a fluidization process at a wide range of flow rates before the bubble transition point is reached. For example, as discussed above, it has been found that the larger the magnetization M of the fluidizable and magnetizible particles up to the point of agglomeration, the higher will be the transition velocity $U_T$ up to which the stably fluidized bed may be operated without bubbling and time-varying fluctuation, all other variables being equal. It will be recognized that in practicing the invention, it is the intent to operate the process in the stable, non-fluctuation manner wherein the stably fluidized bed is bubble-free. Accordingly, the size of bubbles in the stabilized fluidized media, if they do exist, will be about no larger than the spacing between particles and consequently do not cause time-varying fluctuations of the pressure difference through the fluidized bed over a finite period of time, e.g., 10 seconds, preferably a 100 second time interval during continuous fluidization.

As earlier indicated, the fluidization process of the present invention is useful in many applications heretofore used in the fluidization art. Of particular importance are the petroleum processes such as hydrofining, hydrocracking, hydrodesulfurization, catalytic cracking and catalytic reforming. The Table XXI summarizes typical hydrocarbon conversion process conditions effective in the present invention.

The feedstocks suitable for conversion in accordance with the invention include any of the well-known feeds conventionally employed in hydrocarbon conversion processes. Usually, they will be petroleum derived, although other sources such as shale oil and coal are not to be excluded. Typical of such feeds are heavy and light virgin gas oils, coker gas oils, steam-cracked gas oils, middle distillates, steam-cracked naphthas, coker naphthas, cycle oils, deasphalted residua, etc.

GENERAL

Generally, the magnetization M of a particle as obtained from a magnetometer when a given magnetizing field $H_a$ is applied will not provide a value which is the same as the magnetization of the particle in response to the same intensity of magnetic field in the fluidized bed to be used in accordance with the teachings of the present invention.

The purpose of the following is to indicate a method for determining the magnetization $M_p$ of a typical particle in a bed from those values obtained from a magnetometer. Generally, this will require a calculation since the effective field that a bed particle is subjected to depends on the applied field, the bed geometry, the particle geometry, the bed voidage and particle magnetization. A general expression has been derived to relate these quantities based on the classical approximation of the Lorentz cavity that is employed in analogous physical problems such as the polarization of dielectric molecules.

$$H_a = H_e + M_p [d_p + (1-\epsilon_o)(d_b - \tfrac{1}{3})] \quad (1)$$

$H_a$ is the applied magnetic field as measured in the absence of the particles, $H_e$ the magnetic field within a particle, $M_p$ the particle magnetization, $d_p$ the particle demagnetization coefficient, $\epsilon_o$ the voidage in the particle bed, and $d_b$ the bed demagnetization coefficient. The term $-\tfrac{1}{3}$ is due to the magnetizing influence of a (virtual) sphere surrounding the bed particle.

The expression above applies as well to a sample of particles such as used in a magnetometer measurement. In that case $d_b$ is the demagnetization coefficient $d_s$ corresponding to shape of the cavity in the sample holder.

Magnetometer measurement produces a graph of $M_p$ vs. $H_a$. Using the above equation and known values of $d_p$, $d_s$, $\epsilon_o$, $M_p$ and $H_a$ a corresponding value of $H_e$ may be computed. When the value of $H_e$ is small its value found in this manner is determined by a difference between large numbers, hence is subject to cumulative errors. Accordingly, a modified approach is useful as described in the following.

Thus it is useful to define a reference quantity $H_s$ representing the calculated field in a spherical cavity at the location of the particle. It is imagined that the magnetization of surrounding particles is unchanged when the said particle is removed.

$$H_s = H_a - M_p[(1-\epsilon_o)(d_b - \tfrac{1}{3})] \quad (2)$$

Combining the two expression gives an alternate relationship for $H_s$, in which $H_a$ is eliminated.

$$H_s = H_e + M_p d_p \quad (3)$$

This expression is recognized to give $H_s$ as the change of field in passing from the inside of a particle to the outside of the particle.

Denoting $K_m$ as the following constant $$K_m = \frac{1}{(1-\epsilon_o)(d_s - \tfrac{1}{3})} \quad (4)$$

then from (2) $K_m$ equals the quantity $M_p/(H_a - H_s)$ i.e.

$$K_m = M_p/(H_a - H_s) \quad (5)$$

Thus, on the graph of $M_p$ vs. $H_a$ straight lines of slope $K_m$ intersecting the measured curve and the $H_a$ axis relate corresponding values of $M_p$ and $H_s$. Accordingly a graph may be constructed of $M_p$ vs. $H_s$. For example, when the sample is contained in a spherical cavity $d_s = \tfrac{1}{3}$, $K_m$ is infinite, and $H_s$ equals $H_a$. For a long sample such that $d_s = 0$, $K_m$ is negative and $H_a$ is less than $H_s$ i.e. the field magnetizing a particle of the sample is greater than the field applied to the sample.

Additionally, for a process bed, a constant $K_p$ may be defined as follows:

$$K_p = \frac{1}{[(1-\epsilon_o)(d_b - \tfrac{1}{3})]} \quad (6)$$

It may also be seen from Eq. (2) that a line of slope $-K_p$ passing through a point $H_a$ on the horizontal axis of the graph of $M_p$ vs. $H_s$ intersects the curve on the graph at a value of $M_p$ giving the particle magnetization in the bed. Thus, the particle magnetization $M_p$ in a process bed has been related to the field $H_a$ applied to the process bed.

The relationship of Eq. (1) is an approximation more likely to be accurate for beds having high voidage than for very densely packed samples.

It is to be understood that the term "applied magnetic field" used throughout the specification and claims refers to an empty vessel applied magnetic field.

TABLE XXI

| Principal Conversion Desired | Reaction Conditions | | | |
|---|---|---|---|---|
| | Temperature °F. | Pressure psig | Feed Rate V/V/Hr. | Hydrogen Rate scf/Bbl |
| Hydrofining | 500-800 | 50-2000 | 0.1-10.0 | 500-10,000 |
| Hydrocracking | 450-850 | 200-2000 | 0.1-10.0 | 500-10,000 |
| Catalytic Cracking | 700-1000 | 0-50 | 0.1-20.0 | 0 |
| Catalytic Reforming | 800-1000 | 50-1000 | 0.1-20.0 | 500-10,000 |

It will be understood by those skilled in the art that various modifications of the present invention as described in the foregoing examples may be employed without departing from the scope of the invention. Many variations and modifications thereof will be apparent to those skilled in the art and can be made without departing from the spirit and scope of the invention herein described.

What is claimed is:

1. A fluidized hydrocarbon conversion process which comprises:
    (a) subjecting a fluidized bed comprised of magnetizable, fluidizable composite particles which have catalytic activity for hydrocarbon conversion and which contain 2 to 40 volume % ferro- or ferrimagnetic material to a nontime varying and substantially uniform applied magnetic field having a substantial component along the direction of gravity such that said composite particles have a component of magnetization along the direction of gravity, and
    (b) passing a fluidizing gaseous medium comprising a vaporized hydrocarbon feedstock upwardly through said bed at a superficial gas velocity ranging between:
(i) at least 10% greater than the normal minimum superficial gas velocity required to fluidize the bed in the absence of said applied magnetic field; and
(ii) less than the superficial gas velocity required to cause time-varying fluctuations of pressure difference through said bed for a 0.1 to 1 second time interval during continuous fluidization in the presence of said applied magnetic field.

2. The process of claim 1 wherein said fluidizing gaseous medium includes hydrogen.

3. The process of claim 1 wherein said fluidized bed is at a temperature of 500–800° F., said fluidizing gaseous medium comprises a vaporized petroleum feedstock and hydrogen and said magnetizable, fluidizable composite particles are catalytically active for the catalytic desulfurization of said feedstock.

4. The process of claim 3 wherein at least a portion of said bed is subjected to a substantially uniform applied magnetic field of at least 100 oersteds oriented axially to the flow of gas in the fluidized bed zone and wherein said magnetizable, fluidizable composite particles have a magnetization of at least 150 gauss.

5. The process of claim 1 wherein said fluidized bed is at a temperature of 800–1100° F. and said magnetizable, fluidizable composite particles are catalytically active for the catalytic reforming of said feedstock.

6. The process of claim 1 wherein the uppermost 20–40% region or zone of the bed is stabilized by the applied magnetic field.

* * * * *